US012802089B2

(12) United States Patent
Pattanavekin et al.

(10) Patent No.: US 12,802,089 B2
(45) Date of Patent: Nov. 17, 2026

(54) GREENHOUSE GAS EMISSIONS MANAGEMENT SYSTEM

(71) Applicant: Vekin (Thailand) Co., LTD., Bangkok (TH)

(72) Inventors: Sakayong Pattanavekin, Bangkok (TH); Ekasit Pempoonpipat, Bangkok (TH)

(73) Assignee: VEKIN (THAILAND) CO. LTD., Bangkok (TH)

( * ) Notice: Subject to any disclaimer, the term of this patent is extended or adjusted under 35 U.S.C. 154(b) by 0 days.

(21) Appl. No.: 18/953,974

(22) Filed: Nov. 20, 2024

(65) Prior Publication Data

US 2025/0086660 A1 Mar. 13, 2025

Related U.S. Application Data

(63) Continuation-in-part of application No. PCT/TH2023/000007, filed on Apr. 21, 2023.

(30) Foreign Application Priority Data

May 23, 2022 (TH) ................................ 2201003113

(51) Int. Cl.
*G06Q 30/018* (2023.01)
*G06N 20/00* (2019.01)
*G06Q 40/04* (2012.01)

(52) U.S. Cl.
CPC ......... *G06Q 30/0185* (2013.01); *G06N 20/00* (2019.01); *G06Q 40/04* (2013.01)

(58) Field of Classification Search
None
See application file for complete search history.

(56) References Cited

U.S. PATENT DOCUMENTS 12,190,331 B1 * 1/2025 Russo .................... G06Q 10/04
2011/0099489 A1 * 4/2011 Glenn .................. G06Q 30/018
715/764

(Continued)

OTHER PUBLICATIONS

Yang, Fan, et al. "Blockchain and digital asset transactions-based carbon emissions trading scheme for industrial internet of things." IEEE Transactions on Industrial Informatics 20.4 (2024): 6963-6973. (Year: 2024).*

(Continued)

*Primary Examiner* — Asfand M Sheikh
(74) *Attorney, Agent, or Firm* — Kevin J Fournier Intellectual Property Legal Services Ltd.; Kevin J Fournier

(57) ABSTRACT

A system and method for managing greenhouse gas emissions is described. In one aspect, the system and method are configured to receive real-time emission data from distributed data sources, including IoT sensors, optical character recognition systems, and augmented reality measurement devices. ML models are trained using ML engines based on historical data and the received emission data. The trained models process and validate the real-time emission data using ML engines. Timestamp blocks are generated using a proof of history blockchain architecture with a variable delay function. The validated emission data is stored and verified in the generated timestamp blocks. The verified emission data is transformed into standardized carbon credit tokens. Visualizations of greenhouse gas emissions are displayed on a user interface, showing information from a real-time emission report. The system and method enable automated collection, validation, storage, and visualization of greenhouse gas emission data using blockchain and ML technologies.

16 Claims, 6 Drawing Sheets

(56) References Cited

U.S. PATENT DOCUMENTS

| | | | | |
|---|---|---|---|---|
| 2011/0295609 | A1* | 12/2011 | Koponen | G06Q 10/00 705/1.1 |
| 2017/0011308 | A1* | 1/2017 | Sun | G06F 11/00 |
| 2022/0269842 | A1* | 8/2022 | Umay | G06F 3/04847 |
| 2022/0327538 | A1* | 10/2022 | Kumar | H04L 9/3263 |
| 2022/0351022 | A1* | 11/2022 | Minaz | G06N 3/045 |
| 2022/0358515 | A1* | 11/2022 | Kahn | G06F 30/27 |
| 2023/0061787 | A1* | 3/2023 | Feickert | G06F 16/283 |
| 2023/0162203 | A1* | 5/2023 | Umay | G06Q 50/40 705/317 |
| 2023/0214849 | A1* | 7/2023 | Taylor | G06Q 50/165 705/317 |
| 2024/0078215 | A1* | 3/2024 | Chatterjee | G06N 20/00 |
| 2024/0281702 | A1* | 8/2024 | Thammavongsa | G06Q 50/06 |

OTHER PUBLICATIONS

Sharma, Aniket, Priyanka Verma, and Rajesh Krishnan. "AI-Augmented Blockchain Analytics for Carbon Credit Verification: An Intelligent Risk-Scoring Framework for Trustworthy Transition Finance." Journal of AI Analytics and Applications 1.2 (2023): 47-69. (Year: 2023).*

Parhamfar, Mohammad, Iman Sadeghkhani, and Amir Mohammad Adeli. "Towards the net zero carbon future: A review of blockchain-enabled peer-to-peer carbon trading." Energy Science & Engineering 12.3 (2024): 1242-1264. (Year: 2024).*

* cited by examiner

GREENHOUSE GAS EMISSIONS MANAGEMENT SYSTEM

CROSS-REFERENCE

This application is filed as a continuation-in-part US patent application that claims the US domestic benefit of a PCT application PCT/TH2023/000007 with an international filing date of Apr. 21, 2023, titled "System and method for real-time digital monitoring reporting verification of greenhouse gas emissions and converting to digital asset," and also claims foreign priority from application number 2201003113, filed on May 23, 2022, in Thailand.

FIELD

Various embodiments of the disclosure relate to artificial intelligence-based greenhouse gas emission management systems. More specifically, the greenhouse gas emission management systems may include multiple components, modules, engines, models, frameworks, etc., that may execute operations independently or in cooperation for real-time digital monitoring reporting verification of greenhouse gas emissions.

BACKGROUND

The increasing threat of global warming and climate change has necessitated a concerted effort to reduce greenhouse gas emissions worldwide. Human economic activities and consumption patterns have been identified as primary contributors to this problem, releasing substantial amounts of greenhouse gases into the atmosphere. In response, the international community has established the United Nations Framework Convention on Climate Change (UNFCC) to mitigate the effects of climate change. A key objective of the UNFCC is to limit the global atmosphere temperature not to exceed 2 degrees Celsius and maintain a carbon dioxide concentration in the atmosphere that does not exceed 450 parts per million compared to pre-industrial era levels in the 18th century. This goal is expected to lead to the establishment of national greenhouse gas emission reduction or limitation targets.

The need to monitor, report, and verify greenhouse gas emissions has become increasingly important, particularly at the organizational level, where the concept of carbon footprint has gained prominence. This approach encourages stakeholders to participate in measuring, reporting, and verifying results, as well as setting guidelines to reduce greenhouse gases at their major sources. In Thailand, the Greenhouse Gas Management Organization (TGO) has been responsible for greenhouse gas certification and has implemented measures to measure, report, and verify greenhouse gas emissions. These measures include requirements for designing, developing, managing, reporting, and auditing greenhouse gas inventories of organizations, with examples provided based on the type of organization, such as offices, educational institutions, and industrial plants.

However, the current implementation of these measures is still largely document-based and relies on presentations to stakeholders to verify results, which has several disadvantages. This approach is prone to errors, inaccuracies, and lack of transparency and does not align with international standards. Furthermore, the implementation costs associated with this approach are high. The reliance on manual documentation and presentation-based verification also hinders the ability to track greenhouse gas emissions accurately and efficiently, thereby limiting the effectiveness of efforts to reduce these emissions. A more efficient and effective solution is needed to address these challenges and promote a more sustainable and environmentally friendly approach to greenhouse gas management.

Therefore, there is a need to provide a framework that provides a solution to the aforementioned problems by offering a more efficient, accurate, and transparent approach to greenhouse gas management.

SUMMARY

The system described in the subject specification may implement the steps of the method described. In an embodiment, the system and method are provided for managing greenhouse gas emissions.

In an embodiment, the system and method provide a mechanism to receive real-time greenhouse gas emission data from distributed data sources, including Internet of Things (IoT) sensors, optical character recognition systems, and augmented reality measurement devices. These distributed data sources enable diverse or distributed data collection from multiple sources, allowing for a more robust and accurate emissions monitoring approach. In an embodiment, the system and method may implement a training process mechanism for machine learning models using machine learning engines. The machine learning models may be trained using historical data and real-time greenhouse gas emission data. The machine learning engines may implement mechanisms, techniques or steps to analyze complex datasets, identifying patterns and trends, thereby enhancing the precision of emissions tracking and analysis.

In an embodiment, the system and method may implement a processing mechanism using trained machine learning models to process or analyze received real-time greenhouse gas emission data. The machine learning engines may perform computational analysis, transforming raw data into meaningful insights about emissions patterns and potential environmental impacts. In an embodiment, the system and method may implement a validation process for receiving real-time greenhouse gas emission data using machine learning engines and trained models. The validation mechanism can detect inconsistencies, verify data integrity, and ensure the reliability of emissions information through advanced algorithmic techniques. In an embodiment, the validation mechanism or process may include a multi-stage validation, including validation of the integrity of a data structure by confirming the presence and format of multiple parameters. The multi-stage validation process may further implement an execution of multiple validation rules based on an emission type and source of emissions In an embodiment, the system and method may implement a timestamp block generation process using a proof-of-history-based blockchain architecture with a variable delay function. This cryptographically secure mechanism enables the chronological integrity and immutability of emissions data, preventing potential tampering or unauthorized modifications. The proof-of-history-based blockchain architecture, also interchangeably referred to as blockchain architecture, may include or maintain multiple temporal references for each of the real-time greenhouse gas emission data. In an embodiment, the system and method may implement a storage mechanism for validating real-time greenhouse emission data within generated timestamp blocks. Blockchain-based storage enables data storage that may include technical characteristics of transparent, secure, and verifiable record-keeping of emissions information. In an embodiment, the system and method may implement a verification process for stored real-time greenhouse gas emission data. The verification process or mechanism enables technical advantages of data accuracy, completeness, and compliance with established environmental monitoring standards. The verification mechanism may include dynamically adjusting one or more values based on historical data patterns, seasonal variations, and one or more operational schedules. In an embodiment, the system and method provide a transformation process that converts verified real-time greenhouse emission data into standardized carbon credit tokens. Such transformation into standardized carbon credit tokens enables the monetization and tradable representation of emissions reduction efforts.

In an embodiment, the system and method may implement a visualization mechanism that displays greenhouse gas emissions information through user interface representations. The visualizations offer real-time reporting and comprehensive insights into emissions patterns and trends. In an embodiment, the system and method implement a verifiable delay function (VDF) that may generate sequential timestamps to verify the chronological order of greenhouse gas emission data. Such a cryptographic technique enables the temporal integrity of recorded emissions information. In an embodiment, the system and method may implement an advanced validation process or mechanisms that execute operations to perform anomaly detection, cross-validation of data across distributed data sources, and identification of potential fraudulent entries. The machine learning engines may cooperatively work with the machine learning models to analyze historical patterns and detect and flag potential fraudulent entries or suspicious emissions data.

In an embodiment, the system and method may implement machine learning engines that implement self-organizing data mapping algorithms to classify and categorize emission data according to ISO 14064 standards. The above-described approach enables standardized and internationally recognized emissions reporting. In an embodiment, the system and method may implement smart contract mechanisms that automatically validate emission data based on predefined verification criteria and consensus mechanisms. The smart contracts may be programmable contracts that provide reliability and transparency when monitoring emissions.

In an embodiment, the system and method implement standardized carbon credit tokens implemented as non-fungible tokens (NFTs) that may be traded, transferred, or fractionalized. The above-described mechanism may provide a flexible and dynamic market for emissions reduction credits. In an embodiment, the system and method implement a monitoring unit that executes operations to process concurrent data simultaneously collect and validate data from multiple distributed data sources while maintaining data integrity. This mechanism may enable efficient and comprehensive emissions tracking. In an embodiment, the system and method provide a Web 3.0 dashboard interface with role-based access control and real-time analytics of emission patterns. The interface provides visualization and interaction capabilities for emissions data management.

DETAILED DESCRIPTION

Figure 1:
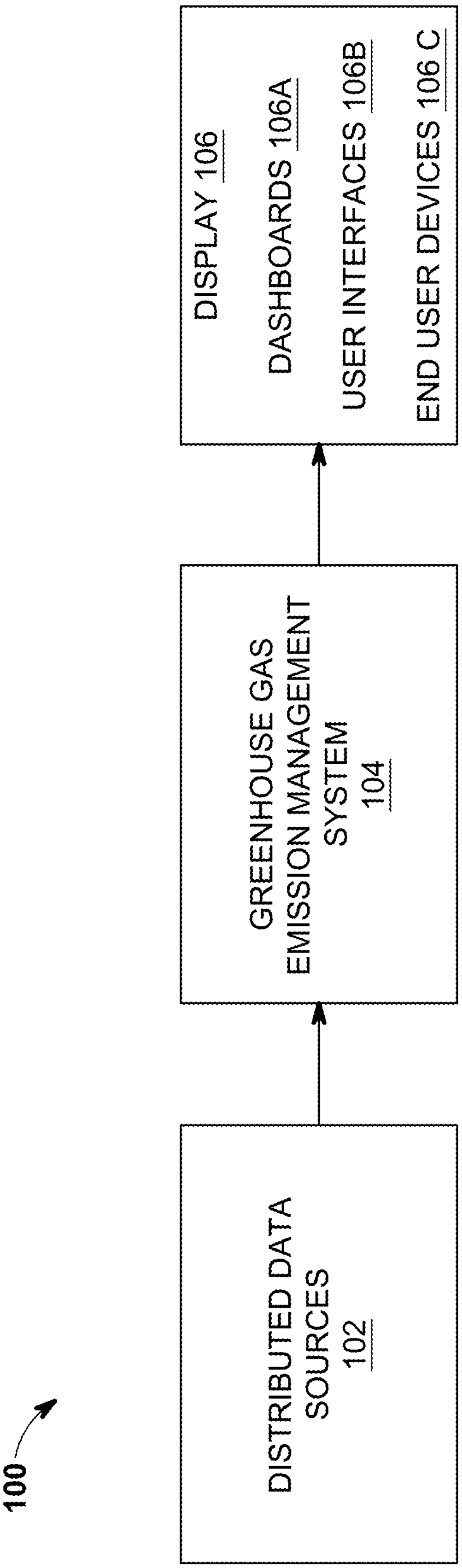
FIG. 1 is a block diagram showing an environment that includes a GGEMS, according to an exemplary embodiment.

The following description provides numerous specific details to provide a thorough understanding of the present disclosure. However, one skilled in the art will realize that the present disclosure may be practiced without these specific details. In other instances, systems, apparatuses, and methods are shown in block diagram form only to avoid obscuring the present disclosure.

In this specification, reference to "one embodiment," "an embodiment," or "example embodiment" means that a particular feature, structure, or characteristic described in connection with the embodiment is included in at least one embodiment of the present disclosure. The appearance of the phrase "in one embodiment" in various places in the specification does not necessarily all refer to the same embodiment, nor are separate or alternative embodiments mutually exclusive of other embodiments. Further, the terms "a" and "an" do not denote a limitation of quantity but denote at least one of the referenced items. Moreover, various features are described, which may be exhibited by some embodiments and not by others. Similarly, various requirements are described, which may be requirements for some embodiments but not for other embodiments.

The terms "comprise," "comprising," "includes," or any other variations thereof are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms machine learning (ML) models or machine learning (ML) engines may refer to a computational, statistical, or mathematical model or engine that is trained on ML modeling techniques. The ML models or the ML engines may be trained over a set of data using techniques or mechanisms that are used to learn or model based on the information in the dataset. An artificial intelligence model may refer to a model built using simple or complex Neural Networks, deep learning techniques, and computer vision techniques or mechanisms. The artificial intelligence model learns from the data and applies that learning to achieve specific pre-defined objectives.

The terms "engine," "module," "unit," "component," "sub-component," "interface," "processor," "system," "subsystem," "controller," and similar terms used throughout this disclosure should be understood broadly as referring to hardware, software, firmware, or any combination thereof that performs the described functions. These terms may be implemented as discrete hardware components, integrated circuits, programmable logic devices, software modules executing on one or more processors, computer program code stored in non-transitory computer-readable media, or combinations thereof. The specific implementation may vary based on design requirements, performance needs, cost constraints, and other engineering considerations.

For example, any engine, module, unit, or component described herein may be implemented as computer-executable instructions stored in memory and executed by one or more processors, as dedicated hardware circuits, as programmable logic devices, or as combinations thereof. Multiple engines, modules, units, or components may be combined into a single component, or a single component may be distributed across multiple discrete components, depending on the particular implementation requirements. The components may communicate and interact through any suitable communication channels, buses, networks, or data pathways.

References to any particular engine, module, unit, or component should not be construed as requiring a specific type of implementation. The actual implementation may be realized in hardware, software, firmware, or combinations thereof based on engineering tradeoffs and design choices for a particular application. Different implementations may utilize different combinations of hardware and software components to achieve the functionality described.

The system components may be physically or logically distributed across multiple computing devices or consolidated into a single physical device. The specific partitioning of functionality between different components may vary between implementations while still achieving the described technical operations or functions. Components described as separate may be integrated, and integrated components may be separated into discrete components based on the requirements of a particular implementation.

An artificial intelligence (AI) based greenhouse gas emission management system (GGEMS) is described herein. In an embodiment, the GGEMS may also be referred to as a system, an integrated system, etc., when embodied with one or more hardware processing elements. The GGEMS may further include a communicatively coupled integrated framework of multiple ML engines and ML models that may execute operations independently or in cooperation to perform certain operations or functions. The AI-based GGEMS may also be interchangeably referred to as an integrated GGEMS or an integrated system and may include an independent or collaborative execution of operations by multiple engines, modules, units, components, sub-components, models, circuitries executing logic, code, etc. The GGEMS may implement the execution of multiple engines that may be configured to train multiple ML models and may execute specific operations or tasks either independently or in cooperation. In an embodiment, the training and retraining steps may include adjusting the weights of nodes in the ML models. A model or a means or a mechanism of modeling may include creating or improvising a functional or operational aspect of a system or features of the system by referencing an existing or known knowledge base. The outcome of the modeling process is to learn or train continually from the data, modify the data, and optimize or improve the functional or operational aspects or features of the system.

The present disclosure discloses a system and method that implements a mechanism described for managing greenhouse gas emissions through an integrated approach combining real-time monitoring, blockchain-based verification, and ML-enabled validation.

In an embodiment, the GGEMS may execute operations that may include, for example, monitoring, identification, verification, processing or analysis, computations, evaluation, reporting, quantification, and visualization. Modeling may be automated through a continual process of training the ML model with data from multiple sources. The engines, the models, the circuitries executing logic, the code, etc., may implement an execution of the functions or operations based on configured rules and/or a sequence of steps to produce specific outcomes. In an embodiment, the GGEMS may adapt to execute operations based on the data, modifications, or changes in the data. For example, metrics may be computed using the input data, modifications to the data, one or more rules, one or more policies, one or more techniques or mechanisms, one or more outputs of the ML engines, one or more outputs of the ML models, etc. In an embodiment, the term automatic in the subject specification may correspond to the adaptation that may be in response to the execution of operations by the engines, circuits, models, systems, etc., without any human intervention. The term real-time may correspond to a system response that is immediately based on received data or modifications in the received data.

In an embodiment, the GGEMS may implement the mechanism described or steps for real-time digital monitoring, reporting, and verification of greenhouse gas emissions. The mechanism or steps may include the monitoring step that acquires greenhouse gas emission data from various data sources. The data is acquired from the distributed data sources, which provide the necessary information for monitoring and tracking greenhouse gas emissions. In an embodiment, the reporting step may receive the data from the monitoring step and store it in a blockchain, specifically a Proof of History blockchain that applies or implements a Verifiable Delay Function (VDF) and hashes in the order of the timestamp. This type of blockchain is particularly suitable for this application due to its ability to provide a secure and transparent record of data. In an embodiment, the reporting step also processes the data and creates a report using various techniques, including fraud protection and self-organizing data mapping. The above-described techniques may enable the creation of accurate and reliable reports that can be used for verification and tracking purposes. In an embodiment, the verification step may verify the data stored in the blockchain by setting up a validating node of a smart contract in the blockchain. This node acts as a third-party verifier to verify the greenhouse gas emission data, providing an additional layer of security and accuracy. In an embodiment, the reporting step may store the result in the blockchain and display it through an application and dashboard via, for example, Web 3.0-based technology. The result may also be sent to a third party via an application programming interface (API), providing flexibility for commercial use. Furthermore, the result is a plug-in feature for the operating system that the user normally uses without interfering with the system operation.

In an embodiment, the integrated system may provide and implement decision-based logic, multiple interfaces, engines and/or models, frameworks, one or more circuitries, and/or code executable by the circuitries. The engines, models, and frameworks implemented by the integrated system may execute operations or functions, either independently or in cooperation. An engine may correspond to a special purpose program or an executable code that performs or executes one or more core functions or operations. Modeling may correspond to a mechanism or a process that includes creating or improvising a functional or operational aspect of a system or one or more features of the system by referencing an existing or known knowledge base. The outcome of the modeling process is to simplify the functional or operational aspect of the system or one or more features of the system that can be easily understood, quantified, and visualized. The mechanism for modeling may be automated through a continual process of training the model with data from multiple sources. The engines and/or the models may implement the execution of one or more core functions or operations based on configured one or more rules and/or one or more sequences of steps to produce specific outcomes. The engines and/or models may be configured to work either independently or in conjunction with one or more engines or one or more models.

FIG. 1 is a block diagram showing an environment 100 that includes a GGEMS, according to an exemplary embodiment. FIG. 1 is an illustration showing an environment 100 that includes a communicatively coupled arrangement of distributed data sources 102, a GGEMS 104, and a display 106. In an embodiment, the distributed data sources 102 may also be referred to as data sources and may include information or data from multiple sources. For example, the distributed data sources 102 may include data or information from the documents, which may be read by optical character recognition (OCR) systems, which may implement a technique of ML to reduce steps and errors in storing in the system and avoid double counting problems. Further, the distributed data sources 102 may include the data or information from objects that are classified and identified by image classification and image identification with artificial intelligence and object recognition technology, which are ML techniques (e.g., using ML models and ML engines) to sort and identify objects for checking the amount of greenhouse gases.

In an embodiment, the distributed data sources 102 may further include the data or information from object measurement by augmented reality (AR) devices, which may include a combination of reality and the virtual world by creating simulation or virtual objects with information technology devices and performing color detection to check. Further, the distributed data sources 102 may include the data source from the Internet of Things (IoT) sensors or IoT devices, which may be connected to track and measure activities that cause greenhouse gas emissions. Further, the distributed data sources 102 may include data from an application programming interface (API) and from the database that is configured to work cooperatively with database types in both SQL and non-SQL formats.

In an embodiment, the GGEMS 104 may include an integration of multiple ML engines (not shown), ML models (not shown), a monitoring unit or module (not shown), a reporting unit or module (not shown), a verification unit or module (not shown), and a converting unit or module (not shown). The GGEMS 104 may implement the execution of multiple ML engines, ML models, circuitries, code executed by the circuitries, etc., to execute specific operations or functions. The ML engines may execute operations by augmenting or accessing data related to historical data, real-time data, and data from distributed data sources 102.

In an embodiment, the GGEMS 104 may implement the execution of multiple operations on the data that is stored in the distributed data sources 102. The results or outcomes of the execution of the operations may include implementing operations or functions for a monitoring unit that receives real-time greenhouse gas emission data from the distributed data sources 102. The real-time data collection enables continuous monitoring of emission sources without manual intervention.

Further, GGEMS 102 implements the steps of providing ML models that are trained using ML engines based on the received real-time greenhouse gas emission data. The ML models adapt to patterns in emission data and improve accuracy over time through iterative training. Further, GGEMS 102 implements the steps of processing real-time greenhouse gas emission data using trained ML models and a reporting unit. The processing includes validation of the received data through the trained models to ensure data integrity and accuracy. Further, GGEMS 104 implements the steps of generation of timestamp blocks using a proof of history blockchain architecture with a variable delay function. The blockchain architecture creates an immutable record of emission data with precise temporal ordering. Further, GGEMS 104 implements the steps of storing validated real-time greenhouse emission data in generated timestamp blocks. The blockchain-based storage ensures data immutability and creates an auditable trail of emission records.

In an embodiment, the GGEMS 104 implements a mechanism for the verification of stored real-time greenhouse gas emission data using a verification unit. The verification step or mechanism ensures compliance with emission reporting standards. Further, GGEMS 104 implements the steps of transforming or converting verified real-time greenhouse emission data into standardized carbon credit tokens using a converting unit. The tokenization enables standardized trading and exchange of carbon credits. Further, GGEMS 104 implements the steps of generation of real-time visualization of greenhouse gas emissions on a user interface. The visualization includes real-time greenhouse gas emission reports that enable monitoring of emission trends and patterns.

In an embodiment, the blockchain architecture implements or uses a variable delay function to create verifiable time records. The carbon credit tokens conform to established carbon trading standards. The real-time visualization incorporates interactive graphical elements for data representation. The GGEMS 104 architecture enables scalable processing of emission data from multiple sources simultaneously.

In an embodiment, the display 106 system may include dashboards 106A, user interfaces 106B, end-user devices 106C, etc. The display 106 system may be configured to generate dashboards 106A and UIs 106B to display the visualizations created or generated in response to the execution of the operations by the GGEMS 104. The dashboards 106A and UIs 106B generated may be configured to receive inputs, and based on the received inputs, the GGEMS 104 may execute further operations to modify the displayed output dynamically and update the generated reports.

Figure 2:
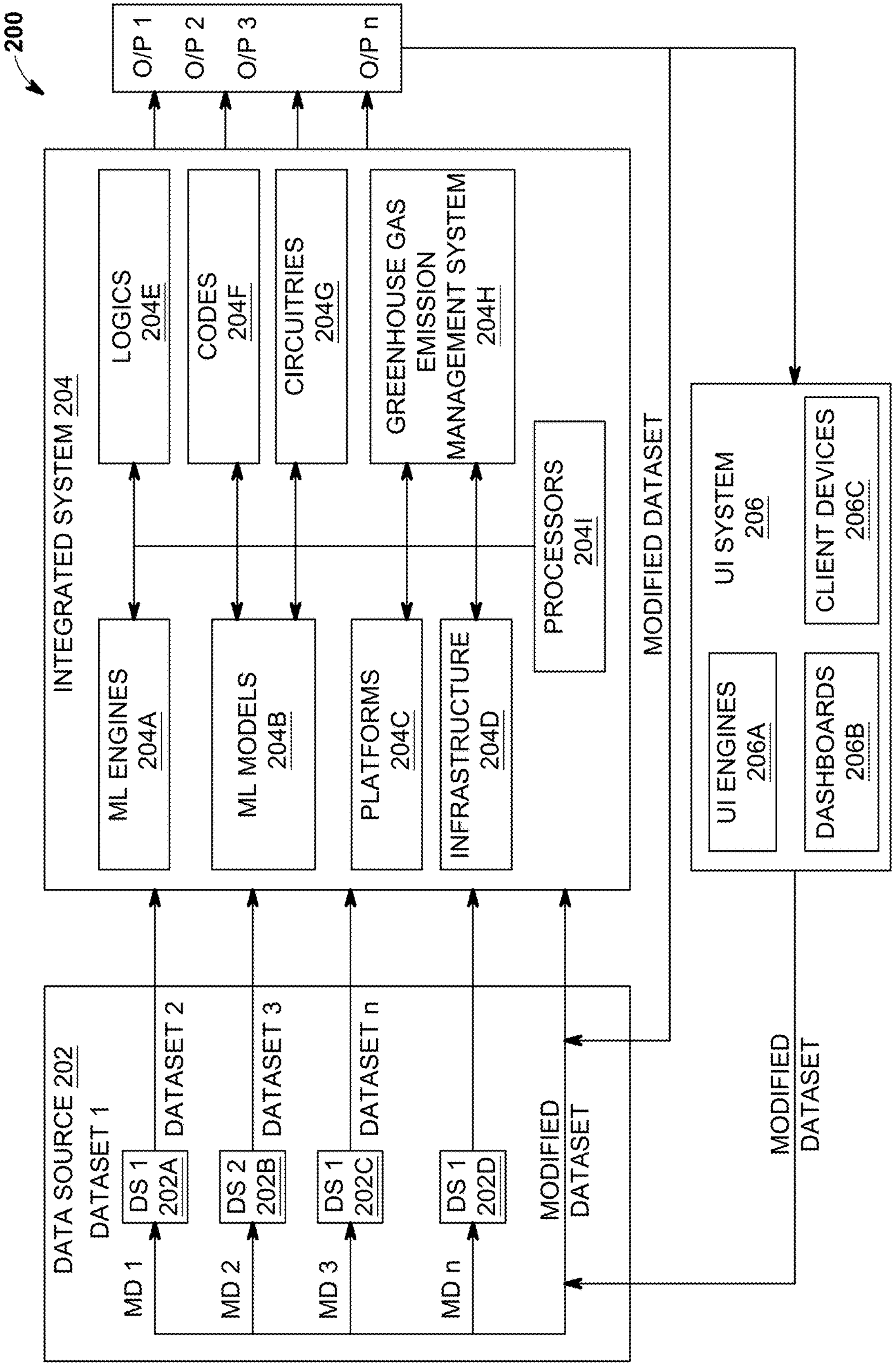
FIG. 2 is a block diagram showing an environment that includes a deployment of GGEMS, according to an exemplary embodiment.

FIG. 2 is a block diagram showing an environment 200 that includes a deployment of GGEMS, according to an exemplary embodiment. FIG. 2 is described in conjunction with FIG. 1. FIG. 2 shows an illustration of an environment 200 that includes a communicatively coupled arrangement of data sources 202, an integrated system 204, and a UI system 206. As described with reference to FIG. 1, the data sources (e.g., 102 and 202) may include multiple data repositories (e.g., DS1 202A, DS2 202B, DS3 202C, . . . . DSn 202D) respectively storing multiple datasets (e.g., DATASET 1, DATASET 2, DATASET 3, . . . . DATASET n). In an embodiment, the data sources 202 may source data or information from multiple data sources (e.g., 202A, 202B, 202C, and 202D). For example, such data sources (e.g., 202A, 202B, 202C, and 202D) may include data or information from multiple distributed data sources 102, as described with reference to FIG. 1.

In an embodiment, the data or information received from the distributed data sources 102 may be stored in multiple formats that may be pre-processed and normalized by the machine learning (ML) engines (e.g., 204A), machine learning (ML) models 204B, platforms 204C, infrastructure 204D, GGEMS 204H, etc. In an embodiment, the data sources 202 may include modified data (e.g., MD1, MD2, MD3, . . . . MDn) that may be generated in response to the execution of operations by the integrated system 204. Further, the modified dataset may be generated or produced when external users provide inputs via the UI system 206. In an embodiment, the modified dataset may be generated or produced when ML engines 204A execute operations on the data received, and this modified data is stored back in data sources 202.

In an embodiment, the integrated system 204 may include multiple ML engines 204A, ML models 204B, platforms 204C, logic 204E, codes 204F, circuitries 204G, GGEMS 204H, infrastructure 204D, and processors 204I that may be communicatively coupled with each other. For instance, an ML engine may correspond to a special purpose program or an executable code that performs or executes one or more core functions or operations. The ML models 204B may be trained by the ML engines 204A in real-time or based on historical information or training data based on data from multiple distributed data sources 102 or data sources 202. In an embodiment, the training and retraining steps or mechanisms may include adjusting the weights of nodes in the ML models based on patterns detected in the dataset, for example, the first data set, the second dataset, etc. The ML engine 204A may execute operations on the data, and the ML models 204B may be retrained based on the modified dataset. The weights of the nodes of the ML models 204B may be adjusted or modified based on the patterns in the modified dataset. In an embodiment, the dataset may include historical data related to greenhouse emissions, etc. The ML engines 204A and/or ML models 204B may be configured to execute operations or functions independently or in conjunction with one or more engines or models. In an embodiment, the training or retraining of the ML models 204B may be based on the outputs, including adjusting the weights of the nodes using backpropagation. The above-described arrangement enables the ML models 204B to continuously improve its accuracy and adapt to new data or changing circumstances, thereby improving the overall performance of the GGEMS 204H, 104 operations.

In an embodiment, the execution of operations by the ML engines 204A, the ML models 204B, etc., may produce outputs or specific outcomes (e.g., o/p1 1, o/p 22, o/p 3, . . . o/p n). The outputs or specific outcomes (e.g., o/p 1, o/p 2, o/p 3, . . . o/p n) may be received and displayed at the UI system 206. In an embodiment, the outputs or specific outcomes (e.g., o/p 1, o/p 2, o/p 3, . . . o/p n) may represent a modified dataset. Further, the outputs or specific outcomes (e.g., o/p 1, o/p 2, o/p 3, . . . o/p n) may be used by the end-user or be modified through suitable user interfaces (UIs) (e.g., dashboards, screens, etc.) or computing devices (e.g., mobile phones, computers, PDAs, portable electronic equipment, etc.) in the UI system 206. The modified dataset (e.g., MD 1, MD 2, MD 3 . . . MD n) may be stored back into the multiple data stores (e.g., DS1 202A, DS2 202B . . . DSn 202D). Further, the modified dataset may be used to retrain the ML engines 204A or the ML models 204B in the integrated system 204. In an embodiment, the machine learning engines 204A and the ML models 204B may implement fraud detection to help filter the accuracy of the data, detect data abnormalities, and prevent manipulation that may occur from data received from the monitoring unit. The ML engines 204A or the ML models 204B may implement self-organizing data mapping by deep learning to manage, classify, and synthesize data in accordance with the standards for reporting greenhouse gas emissions for both domestic and international standards.

In an embodiment, the integrated system 204 may execute operations to process the data from the distributed data sources 102 and perform multiple analyses. For instance, such analysis may be performed in multiple dimensions. In an embodiment, the integrated system 204 may implement the execution of operations of the ML engines 204A, the ML models 204B, the platforms 204C, the GGEMS 204H, and the infrastructure 204D via one or more logics (e.g., 204E), one or more circuitries (e.g., 204G), and/or one or more codes (e.g., 204F) that are executable by the processors (e.g., 204I). Such implementation may facilitate the execution of operations by the ML engines 204A, the ML models 204B, the platforms 204C, the GGEMS 204H, the infrastructure 204D via one or more logics (e.g., 204E), one or more circuitries (e.g., 204G), and/or one or more codes (e.g., 204F) that are executable by the processors (e.g., 204I). In an embodiment, the ML engines 204A and the ML models 204B may execute operations to augment datasets (e.g., the first datasets, the second datasets, modified datasets, etc.) and perform contextual-based analysis and identifications or determinations based on the datasets (e.g., first datasets, second datasets, modified datasets, historical information, or historical datasets, etc.).

In an embodiment, the GGEMS 204H may implement multiple ML models 204B trained using ML engines 204A to process and validate greenhouse gas emission data. The ML models 204 are trained using both historical emission data patterns and real-time data streams from diverse sources, including IoT sensors, optical character recognition systems, and augmented reality measurement devices. The training process may include supervised learning techniques where the ML models 204B learn from verified historical emission data to establish baseline patterns and identify anomalies in real-time data streams.

The ML engines 204A may implement deep neural networks to execute operations for fraud detection and self-organizing data mapping. For fraud detection, the GGEMS 104, 204H may implement a combination of convolutional neural networks and recurrent neural networks trained on historical patterns of verified emission data. These networks learn to identify subtle anomalies and potential fraudulent entries by analyzing temporal patterns, cross-correlating data from multiple sources, and detecting statistical outliers in emission measurements. The fraud detection ML models 204B may be continuously refined through reinforcement learning mechanisms that incorporate feedback from successful fraud identification cases.

In an embodiment, the self-organizing data mapping mechanism may be implemented using deep learning algorithms using the ML engines 204A and ML models 204B, which may automatically categorize and organize emission data according to ISO 14064 standards. This mechanism implements hierarchical clustering algorithms and self-organizing maps to classify emission data into appropriate categories based on source type, measurement methodology, and verification status. The self-organizing maps are trained using unsupervised learning techniques that identify natural groupings and patterns within the emission data, enabling automatic classification of new data points as they enter the GGEMS 104, 204H.

In an embodiment, the GGEMS 104, 204H implemented using the integrated system 204 includes the ML engines 204A and ML models 204B may execute operations with parallel processing capabilities to manage multiple data streams while maintaining data integrity simultaneously. Each diversified data source 102 and 202 may undergo preliminary processing through dedicated neural network layers that normalize and standardize the inputs according to predefined emission measurement units. The normalized data is then processed through augmented ML models 204B that combine predictions from multiple neural networks to enhance the accuracy and reliability of fraud detection. In an embodiment, the ML models may implement adaptive learning mechanisms that may continuously update their parameters based on new data patterns and verification results. This adaptive capability enables the GGEMS 104, 204H to be operable and responsive to emerging fraud patterns and evolving emission measurement methodologies. The ML models 204B implement attention mechanisms to focus on critical data features that are most relevant for fraud detection and classification, improving the efficiency of real-time data processing and validation.

For real-time data processing, the GGEMS 104, 204H may implement ML algorithms that may process and validate emission data as it arrives from diverse data sources 102, 202. These algorithms work in conjunction with the proof of history blockchain architecture, using the temporal information from the Verifiable Delay Function to maintain chronological consistency in data validation and fraud detection. The ML algorithms may implement sliding window techniques to maintain context awareness while processing real-time data streams, enabling the detection of temporal anomalies and patterns that might indicate fraudulent activities.

The GGEMS 104, 204H ML components (e.g., 204A, 204B) may be integrated with smart contract validation mechanisms, where the trained ML models 204B may provide input for automated validation decisions. The ML outputs may be encoded into the blockchain through cryptographic hashing, ensuring the immutability of both the validation results and the ML model 204B states used for validation. Such integration enables transparent and verifiable ML-based decisions while maintaining the security and integrity of the emission data validation process.

In an embodiment, the combination of supervised, unsupervised, and reinforcement learning techniques enables the GGEMS 104, 204H to adapt to new fraud patterns while maintaining high accuracy in emission data validation and classification. The integration with blockchain enables the transparency and verifiability of ML-based decisions, creating a reliable framework for greenhouse gas emission monitoring and verification.

In an embodiment, the UI system 206 may include UI engines 206A, dashboards 206B, and client devices 206C that may display the integrated system's 204 results or outcome of the execution of the operations. The UI engines 206A may be configured to create or generate UIs that may provide an interface to interact with the end users. For example, the UIs created or generated by the UI engines may be configured to receive inputs from end users, and based on these inputs (e.g., represented by modified datasets), the ML engines 204A and the ML models 204B may be trained or retrained. The mechanism of training or retraining the ML engines 204A or the ML models 204B may further enable improvising or refining the specific outcomes or specific results. In an embodiment, refining or improvising may correspond to improving technical outcomes or technical metrics, such as key performance indicators or key performance values, thereby leading to improved outcomes associated with the real-time monitoring and reporting of greenhouse gas emissions. The ML engines 204A, the ML models 204B, etc., may execute operations to perform computations or re-computations based on specific modifications of the dataset (e.g., the first dataset, the second dataset, etc., represented by the modified dataset) and may retrain the ML engines 204A and the ML models 204B thereby providing the real-time digital monitoring reporting verification of greenhouse gas emissions. In an embodiment, the mechanism or training or retraining of the ML models 204B using the ML engines 204A may adjust or modify the weights of the nodes in the ML models 204B.

For example, consider a manufacturing facility that may include a deployment of GGEMS 104, 204H to track its carbon dioxide emissions. The GGEMS 104, 204H may execute operations to activate a monitoring unit that may receive real-time greenhouse gas emission data from distributed sources. For example, the manufacturing facility has IoT sensors or IoT devices that may be installed at emission points, OCR systems scanning manual measurement logs, and AR devices used by operators for visual emission inspections. When an IoT sensor detects a CO2 emission of 50 metric tons at 14:00:00, this data is immediately transmitted to the monitoring unit.

In an embodiment, the ML engines 204A may train the ML models 204B using historical emission patterns specific to the manufacturing facility. Using these trained ML models 204B, the reporting unit may process and validate the incoming emission data. For the 50-metric ton CO2 reading, the ML models analyze the data against historical patterns, operational parameters, and expected emission ranges for the facility's current production level. Following validation, the GGEMS 104, 204H may generate timestamp blocks using a proof of history blockchain architecture with a variable delay function. For the example emission reading, the Verifiable Delay Function (VDF) creates a sequential timestamp that cryptographically proves the reading occurred at 14:00:00, establishing an immutable chronological record.

In an embodiment, the 50-metric ton reading is cross-validated against other sensor readings, production data, and historical emission patterns to ensure consistency. The GGEMS 104, 204H may implement smart contracts for automated validation. The smart contract verifies that the 50-metric ton reading meets all predefined criteria, including measurement accuracy, temporal consistency, and compliance with operational parameters. Once verified, the converting unit transforms the validated emission data into standardized carbon credit tokens. For example, the 50-metric ton CO2 emission is transformed into corresponding carbon credit tokens that can be traded on carbon markets.

In an embodiment, the GGEMS 104, 204H may maintain data integrity through parallel processing that enables the integrated system 204 to process multiple emission readings simultaneously while ensuring data consistency. Real-time visualization is provided through a Web 3.0 dashboard interface. The GGEMS 104, 204H API interface may enable authorized external verifiers and regulatory bodies to access the facility's emission data while maintaining the integrity of the blockchain records.

Figure 3:
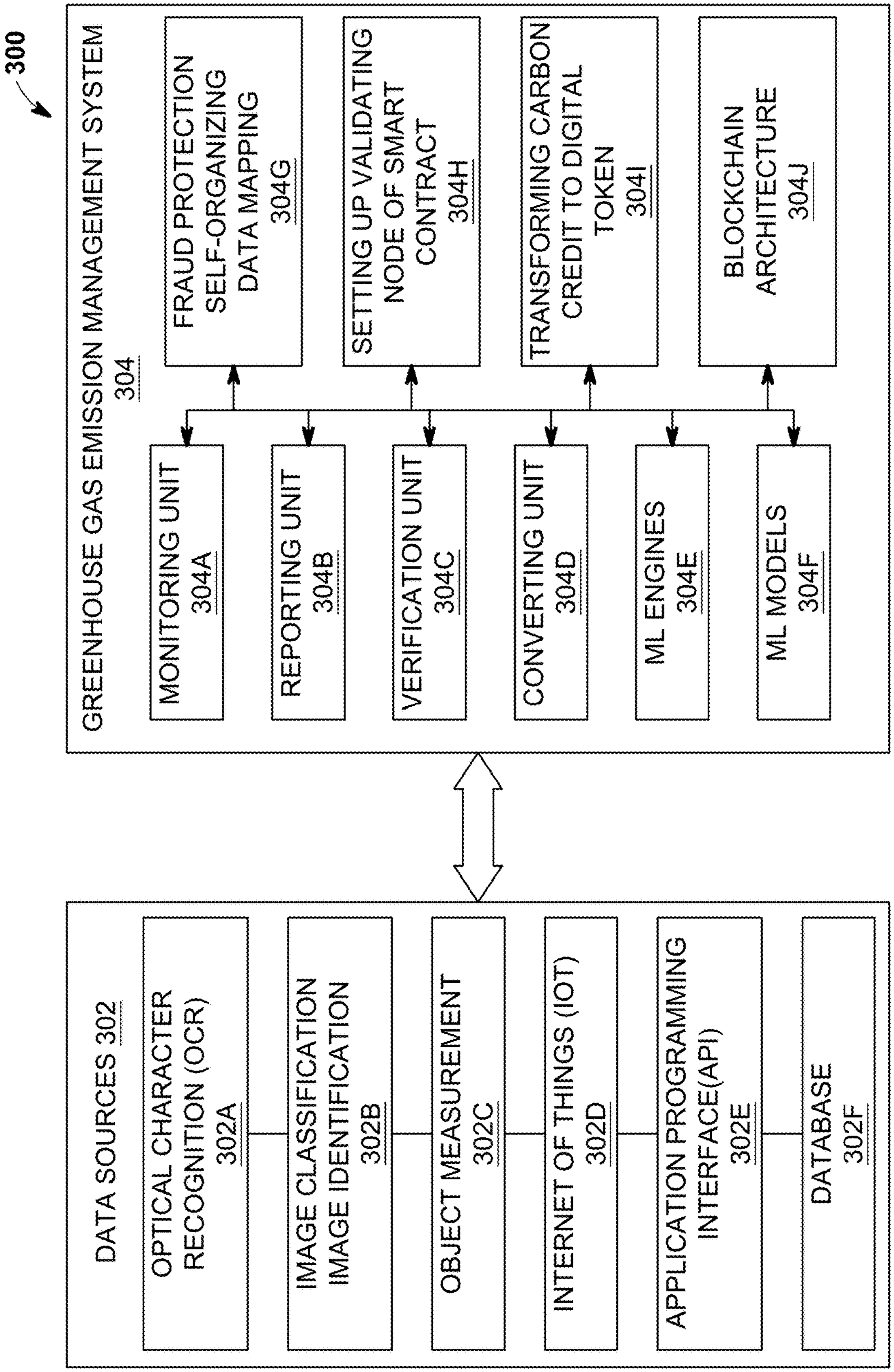
FIG. 3 is a block diagram illustrating the deployment of the GGEMS, according to an exemplary embodiment.

FIG. 3 is a block diagram 300 illustrating the deployment of the GGEMS, according to an exemplary embodiment.

FIG. 3 is described in conjunction with FIG. 1 and FIG. 2. FIG. 3 is a block diagram 300 showing an illustration of the deployment 300 of the GGEMS 104, 204H, and 304. In an embodiment, the GGEMS 104, 204H, and 304 may implement the execution of multiple circuitries, engines, models, etc., to execute specific operations, as described in FIG. 1 and FIG. 2. The GGEMS 104, 204H, and 304 may execute the above-described operations on the information, including data assimilated from multiple distributed data sources 102, 202, and 302. The distributed data sources 102, 202, and 302 may include data or information (e.g., OCR 302A, image classification and image identification 302B, object measurement 302C, IoT 302D sensors data, API 302E data, and database 302F) as described in the detailed description of FIG. 1.

In an embodiment, the GGEMS 104, 204H, and 304 may implement the execution of multiple circuitries, decision logic, engines, etc. (as shown and described with reference to FIG. 2) that may work independently or in cooperation to execute operations. For example, the ML engines 204A, 304E in the GGEMS 104, 204H, and 304 may execute operations for fraud protection (e.g., 304G) by filtering the data for the accuracy of the data, detecting data abnormalities, and preventing manipulation that may occur from data received from the monitoring unit. In an embodiment, the ML engines 204A, 304E and the ML models 204B, 304F may be trained to implement self-organizing data mapping (e.g., 304G) using deep learning to manage, classify, and synthesize data in accordance with the standards for reporting greenhouse gas emissions for both domestic and international standards.

Referring to FIG.3, the GGEMS 104, 204H, and 304 may include a monitoring unit 304A, a reporting unit 304B, a verification unit 304C, and a converting unit 304D. In an embodiment, the monitoring unit 304A may be configured to acquire or receive greenhouse gas emission data from multiple distributed data sources 102, 202, and 302. For example, the data from such distributed data sources may include documents that may be read by optical character recognition (OCR) systems (e.g., 302A) in cooperation with the ML engines 204A and 304E, which may enable reducing the steps and errors in storing in the GGEMS 104, 204H and 304 and avoiding double counting problems. Further, the data may include objects that may be classified and identified by image classification and image identification in cooperation with the ML engines 204A and 304E and the ML models 204B and 304F. The image classification and identification (e.g., 302B) data extraction or processing-related operations or functions may be executed using object recognition systems or devices that may implement ML engines 204A 304E to sort and identify objects to check the amount of greenhouse gases.

In an embodiment, the data from the distributed data sources 102, 202, and 302 may further include objects (e.g., 302C) that may be measured or tracked using augmented reality (AR) devices or systems that may include a combination of a real-world and virtual world. Such objects (e.g., 302C) may be created by simulation or virtual objects with systems or devices that may be performing color detection. Further, the data from the distributed data sources may include data from the Internet of Things (IoT) (e.g., 302D) sensors or devices that may be connected to track and measure activities that cause greenhouse gas emissions. Further, the data from the distributed data sources 102, 202, and 302 may include data sourced via an application programming interface (API) (e.g., 302E) or databases (e.g., 302F) that support database types in both SQL and non-SQL formats.

In an embodiment, the reporting unit 304B may be operable or be configured to execute operations to obtain the data from the monitoring unit 304A and store the data in a blockchain. For instance, the blockchain used to store the data is the Proof of History blockchain, which validates and verifies transactions using historical data and by timestamp using the Verifiable Delay Function (VDF). The application or use of VDF may facilitate or provide technical advantages of real-time tracking applications, low power consumption, and low storage latency. Such implementation may facilitate connecting with multiple distributed data sources and sourcing information or data in real-time simultaneously.

In an embodiment, the implementation of the VDF timestamp mechanism enables secure and efficient real-time tracking of greenhouse gas emission data through a proof-of-history blockchain architecture. The VDF timestamp may include a specialized processing system that generates verifiable chronological records of emission data while maintaining data integrity and minimizing computational overhead. For instance, the VDF timestamp mechanism may receive real-time greenhouse gas emission data from the monitoring unit 304A, which collects data from distributed sources, including Internet of Things (IoT) sensors, optical character recognition systems, and augmented reality measurement devices. Upon receipt of new emission data, the VDF timestamp mechanism executes a sequential process to create and verify chronological records.

In an embodiment, the VDF timestamp mechanism may generate timestamps through an iterative hashing procedure. For each new emission data point, the mechanism, for example, retrieves the hash value of the previous block in the blockchain, combines this hash with the current temporal information, performs a computationally sequential function that requires a verifiable time delay to complete, and generates a new hash value that cryptographically proves the passage of time between the current and previous blocks.

For example, when an IoT sensor reports a carbon dioxide emission measurement, the VDF timestamp mechanism processes this data by first accessing the most recent blockchain hash (e.g., "abc123"). The mechanism then incorporates the precise measurement time (e.g., "14:00:00") and executes the delay function to produce a new verifiable hash (e.g., "xyz789"). The new hash mathematically demonstrates that the emission measurement occurred after the previous block but before any subsequent blocks, establishing an immutable chronological order.

In an embodiment, the reporting unit 304B may be configured to organize the timestamped emission data into a specialized block structure that may include, for example, a unique timestamp identifier, the previous block's hash value, the newly computed VDF hash, a reference pointer to the associated emission data record. In an embodiment, the blockchain architecture 304G stores these timestamp blocks in sequential order, creating a verifiable chain of emission events. Each block's timestamp serves as a key identifier that enables efficient access to the corresponding emission data while maintaining a compact blockchain structure that primarily stores temporal proof rather than complete data records.

In an embodiment, the VDF timestamp mechanism may provide several technical advantages, such as enhanced scalability through lightweight timestamp-based storage, reduced energy consumption compared to proof-of-work systems, mathematically verifiable chronological ordering without external time validators, efficient processing of high-frequency real-time data streams, and robust protection against temporal spoofing attacks. In an embodiment, the verification unit may apply or implement the VDF timestamp mechanism to validate emission data by, for example, verifying the computational delay between sequential blocks, confirming the mathematical relationship between consecutive hash values, checking the integrity of timestamp sequences, validating the chronological consistency of emission records.

For instance, if the GGEMS receives a new emission reading at 14:05:00, the VDF timestamp mechanism can mathematically prove that exactly five minutes have elapsed since the previous reading at 14:00:00 through the verifiable computational delay encoded in the hash values. The VDF timestamp mechanism may integrate with smart contracts in the blockchain architecture 304J to enable automated validation of emission data. The smart contracts verify the timestamp integrity and chronological consistency before processing emission data for carbon credit conversion or regulatory compliance purposes. In an embodiment, the converting unit 304D may implement or apply the verified timestamp data to ensure accurate and auditable conversion of emission measurements into standardized carbon credit tokens. The temporal proofs generated by the VDF mechanism provide a crucial foundation for maintaining the integrity of carbon credit trading and regulatory reporting.

In an embodiment, the monitoring unit 304A may be configured to implement a distributed cloud-based architecture to receive greenhouse gas emission data from the distributed data sources. The GGEMS 104, 204H, and 304 may implement an asynchronous publisher-subscriber (Pub-Sub) communication model for real-time data acquisition. In this model, emission data sources function as publishers that broadcast emission events, while the monitoring unit 304A operates or functions as a subscriber that receives and processes relevant greenhouse gas emission data.

In an embodiment, the monitoring unit 304A may be configured to dynamically establish connections with authorized data sources that meet specified criteria for greenhouse gas emission reporting. When emission events occur, the publishing sources transmit data to the monitoring unit 304A through secure cloud channels. Such an arrangement or architecture enables automated real-time collection of both direct and indirect greenhouse gas emissions from multiple distributed data sources 102, 202, and 302. For instance, the Pub-Sub model may facilitate efficient data flow management by enabling the monitoring unit 304A to subscribe to relevant emission data streams selectively. Publishers independently broadcast their emission events, while the monitoring unit 304A receives only the emissions data that matches its subscription criteria. The decoupled architecture of GGEMS 104, 204H, and 304 enables scalable and reliable real-time data collection across the distributed network of emission sources. In an embodiment, the GGEMS 104, 204H, and 304 cloud-based implementation provides the necessary infrastructure for handling large volumes of real-time emission data from distributed data sources 102, 202, and 302 while maintaining data integrity and transmission security. The above-described mechanism may enable continuous monitoring of greenhouse gas emissions across different organizational boundaries and emission types.

In an embodiment, using the Proof of History blockchain-based architecture 304G in conjunction with the reporting unit 304B provides a timestamp from the monitoring unit 304A in the order of the data storing and hashes in the order of the timestamp. The GGEMS 104, 204H, and 304 implement a blockchain architecture 304J for secure storage and verification of greenhouse gas emission data. After the monitoring unit 304A receives emission data from the distributed data sources 102, 202, and 302, the reporting unit 304B integrates this data into the blockchain structure via the blockchain architecture 304J. The GGEMS 104, 204H, and 304 implement a Proof-of-History-based blockchain architecture 304J technique that enables enhanced efficiency for monitoring, reporting, and verification of greenhouse gas emissions. In an embodiment, the blockchain architecture 304J implements a timestamping mechanism using Verifiable Delay Functions. This mechanism creates sequential timestamps for each emission data entry, establishing a chronological chain of blocks. The implementation of VDF may enable the generation of cryptographic hashes that incorporate both the previous block's hash value and the elapsed time, ensuring temporal ordering of emission data.

In an embodiment, when the monitoring unit 304A transmits new emission data, the GGEMS 104, 204H, and 304 may assign a temporal identifier to each transaction. The blockchain architecture 304J may generate cryptographic hashes and encrypt the data, creating a chronological sequence of blocks. In an embodiment, the blockchain architecture 304J may include a feature with reference to its storage efficiency. In an embodiment, the blockchain architecture 304J may include or maintain temporal references rather than complete data sets that enable accessing the corresponding emission data, resulting in a lightweight and scalable system capable of processing high-volume emission data streams. The Proof-of-History-based blockchain architecture's 304J efficient data structure enables the GGEMS 104, 204H, and 304 to process and manage large-scale emission monitoring while maintaining performance and scalability.

In an embodiment, the reporting unit 304B may be configured to execute operations to process the data and report greenhouse gas emissions in accordance with ISO 14064, greenhouse gas emission reporting. The reporting unit 304B may execute operations to process the data and create a report using any one or combination of the above-described techniques. For instance, the report may include information or data related to fraud protection (e.g., 304G) by implementing artificial intelligence techniques using ML engines 204A, 304E, and ML models 204B, 304F to help filter the accuracy of the data, detect data abnormalities, and prevent manipulation that may occur from data received from the monitoring unit 304A. In an embodiment, a self-organizing data mapping (e.g., 304G) using deep learning techniques may be implemented by the ML engines 204A, 304E and the ML models 204B, 304F to manage, classify, and synthesize data in accordance with the standards for reporting greenhouse gas emissions for both domestic and international standards.

In an embodiment, the reporting unit 304B may be configured to store results in the blockchain and display them through application and dashboard (e.g., UI, end-user devices, etc.) using Web 3.0 technology. In an embodiment, the results may be sent to a third party via an application programming interface (API) to provide flexibility for commercial use. The result is a plug-in feature for the operating system that the user normally uses without interfering with the system's operation. In an embodiment, the GGEMS 104, 204H, and 304 may implement the Proof-of-History blockchain architecture 304J that includes a distinct verification mechanism focused on temporal validation. This consensus mechanism specifically verifies the chronological sequence and time intervals between emission data events, creating a verifiable temporal record of greenhouse gas emissions.

In an embodiment, the ML engines 204A, 304E, and the ML models 204B and 304F may execute operations for fraud detection and self-organizing data mapping (e.g., 304G) with reference to the greenhouse gas emission data validation and organization. The fraud detection mechanism or process may implement a multi-layered ML approach incorporating composite models for detecting anomalous emission patterns. For example, the ML engines 204A and 304E may implement an Isolation Forest algorithm that may identify anomalous data points by recursively partitioning the emission data space and assigning anomaly scores based on the path length required to isolate specific data points. This mechanism may enable the detection of sudden unusual spikes in emission readings. Concurrently, the ML engines 204A, 304E and the ML models 204B and 304F may implement a One-Class Support Vector Machine that may create a decision boundary around normal emission patterns, identifying outliers that deviate from established operational parameters while adapting to seasonal and operational variations in emission patterns. The ML engines 204A and 304E and the ML models 204B, and 304F may further implement autoencoder neural networks that learn normal emission patterns and identify anomalies through reconstruction error analysis, which may be effective for detecting subtle deviations in complex emission patterns.

In an embodiment, the ML engines 204A, 304E and the ML models 204B and 304F may implement pattern recognition capabilities that may use sequential pattern mining algorithms to identify recurring patterns in emission data, detect unauthorized modifications to historical records, and flag potential fraudulent entries or suspicious temporal entries in emission readings. For example, a distributed validation framework may compare the readings across multiple sensor sources, validate consistency between different measurements, and identify discrepancies between related emission parameters. The above-described independent or cooperative mechanisms may enable robust detection of potentially fraudulent activities while minimizing false positives.

In an embodiment, the GGEMS 104, 204H, and 304 may implement a mechanism for data organization, which may include implementing a hierarchical structure that automatically classifies and categorizes emission data according to ISO 14064 standards. For instance, the data organization mechanism may implement a modified BIRCH algorithm that may create a dynamic feature tree of emission characteristics and automatically adjust the clustering parameters based on data distribution. Such classification framework may execute operations across multiple levels, beginning with a primary classification that categorizes emissions by source type, identifies emission scope classifications, and assigns regulatory compliance categories. The secondary classification layer organizes emissions by process type, maps data to specific industry sectors, and categorizes them by greenhouse gas type.

In an embodiment, the ML engines 204A, 304E and the ML models 204B, 304F models in the GGEMS 104, 204H, and 304 may provide adaptive learning capabilities to continuously update classification parameters through reinforcement learning algorithms and feedback loops from verification results, ensuring ongoing adaptation to regulatory updates and emerging patterns. During operation, the GGEMS 104, 204H, and 304 may process incoming data through a sequential workflow that begins with data ingestion, where real-time emission data from multiple distributed data sources 102, 202, and 302 is preprocessed for standardization and subjected to initial quality control checks. The fraud detection mechanism may execute in different stages, beginning with primary screening that applies anomaly detection algorithms, performs pattern matching against known fraud signatures, and conducts temporal consistency checks, followed by secondary analysis incorporating cross-validation procedures and contextual analysis.

In an embodiment, the ML engines 204A, 304E and the ML models 204B and 304F may implement the execution of a self-organizing mapping that automatically classifies incoming data, updates organizational hierarchies, and maintains ISO 14064 compliance while integrating with the blockchain verification unit by providing fraud detection confidence scores, submitting organized data structures, and maintaining audit trails of detection results. This integration ensures seamless coordination between fraud detection, data organization, and blockchain verification processes.

In an embodiment, the above-described mechanism implemented by the ML engines 204A, 304E and the ML models 204B and 304F may provide significant technical advantages through its adaptive fraud detection capabilities, which continuously learn from new fraud patterns and adjust detection parameters based on operational changes. The efficient data organization may reduce manual classification requirements while enabling rapid data retrieval and reporting. The GGEMS scalable architecture may be operable or configured to handle increasing data volumes and maintain performance under varying load conditions through cloud-based infrastructure that enables distributed processing capabilities.

The integration of the ML engines 204A, 304E and the ML models 204B, 304F with the GGEMS 104, 204H, and 304 may represent a significant advancement in greenhouse gas emission monitoring and verification, providing automated, reliable, and scalable capabilities for ensuring data integrity while maintaining regulatory compliance. The integration of the above-described advanced fraud detection mechanisms with self-organizing data mapping (e.g., 304G) creates a robust framework for managing the complexities of emission data verification and organization in real-time operational environments.

For example, consider a cement factory in Thailand that must report its greenhouse gas emissions. Traditionally, factory staff may manually record emission readings from various equipment, compile these into reports, and have them verified by licensed inspectors who physically visit the facility. The monitoring unit 304A may configure the GGEMS to monitor and collect data continuously. The reporting unit 304B then processes this data and stores it in a blockchain, creating an unalterable digital record. The GGEMS 104, 204H, and 304 implement the Proof-of-History-based blockchain technique that may create time-stamped references. When a factory's emission sensor records data, the system creates a timestamp using the VDF. The verification unit 340C then automatically validates this data using the blockchain's (e.g., proof-of-history-based blockchain architecture, also referred to as blockchain architecture 304J) consensus mechanisms, replacing the role of human inspectors. After verification, the GGEMS 104, 204H, and 304 may generate standardized reports and visualizations, making it easy for regulators and stakeholders to monitor emissions compliance. In an embodiment, such digital transformation provided by the GGEMS 104, 204H, and 304 may enable the entire mechanism to be more efficient and reliable, reducing the potential for human error while maintaining regulatory compliance. The GGEMS 104, 204H, and 304 system architecture enable emission data not to be tampered with once recorded, providing a trustworthy record of a facility's environmental impact.

In an embodiment, the verification unit 304C may be configured to execute operations to verify the data stored in the blockchain. The verification unit 304C may be operable to a third-party verifier to verify greenhouse gas emissions in real-time. In an embodiment, the GGEMS 104, 204H, and 304 may include the converting unit 304D that may be configured to execute operations for transforming or converting carbon credit resulting from the verification unit 304C into digital assets in the form of digital tokens for users. This token can be traded, exchanged, transferred, fractionalized, or burned.

In an embodiment, the GGEMS 104, 204H, and 304 implement the converting unit 304D to transform verified greenhouse gas emission data into digital assets in the form of standardized carbon credit tokens. The transformation or conversion process occurs after the verification unit 304C has validated the greenhouse gas emission data stored in the blockchain. The standardized carbon credit tokens may be implemented as non-fungible tokens (NFTs) that maintain unique properties and traceability. The standardized carbon credit tokens may be designed for flexibility in transactions, which may be traded on carbon credit markets, transferred between parties, or fractionalized into smaller units. The standardized carbon credit tokens follow standardized formats conforming to ISO 14064 greenhouse gas emission reporting standards.

In an embodiment, the conversion of greenhouse gas emissions data into standardized carbon credit tokens may represent a process or mechanism that transforms environmental measurement into a tradable digital token (e.g., 3041). When verified emissions data passes through the GGEMS 104, 204H, and 304H validation mechanisms, it enters the conversion unit 304D that maps the precise carbon reduction metrics to blockchain-based digital representations. Each token is cryptographically generated to represent a specific quantum of greenhouse gas reduction, with metadata embedded directly into the token's blockchain record that includes detailed provenance information such as emission source, measurement methodology, and verification timestamp. The tokenization process begins by converting or transforming the validated emissions data into a standardized format compatible with blockchain architecture 304J, implementing smart contract protocols (e.g., 304H) that automatically encode the carbon credit's specific characteristics. These characteristics may include the type of emission reduction (e.g., renewable energy project, reforestation initiative, industrial efficiency improvement), geographical origin, and precise carbon offset volume. The smart contracts ensure that each token maintains a verifiable and immutable record of its environmental impact, preventing double-counting and providing transparency throughout the carbon credit lifecycle.

Non-fungible token (NFT) implementation enables a granular representation of carbon credits, where each token becomes a unique digital asset with distinct attributes. This approach enables more sophisticated carbon credit markets by allowing fractional ownership, precise tracking, and enhanced liquidity. The tokens can be traded on specialized carbon markets, transferred between stakeholders, or retired to demonstrate actual carbon neutralization efforts. The blockchain architecture 304J enables the transactions to be recorded transparently, creating an auditable trail that regulators, companies, and environmental organizations can verify.

In an embodiment, the verification unit 304C of the GGEMS 104,204H, and 304 may implement the smart contract validation mechanism (e.g., 304H) that incorporates validation nodes and verification criteria for greenhouse gas emission data authentication. The verification unit 304C may execute operations through a distributed network of validation nodes implementing smart contracts that enforce predefined verification rules while maintaining data integrity within the proof-of-history blockchain architecture 304J.

The verification unit 304C implementing the smart contract validation system operates through a network of distributed nodes, each implementing specialized validation protocols. When greenhouse gas emission data is received by the GGEMS 104, 204H, and 304, for example, when a manufacturing facility reports a carbon dioxide emission reading of 50 metric tons, the validation process automatically initiates through the deployment of smart contracts across multiple validation nodes. Each node independently executes a series of verification procedures defined within the smart contract's code structure.

In an embodiment, the validation nodes implement a multi-stage verification process beginning with data integrity verification. For example, in emission reading, the smart contract first validates the integrity of the data structure by confirming the presence and format of parameters, including timestamp, emission quantity, source identifier, and measurement methodology. The verification unit 304C may then execute a series of validation rules specific to the emission type and source. For example, the smart contract would verify that the 50-metric ton reading falls within historically established operational parameters for the specific facility, considering factors such as production capacity, fuel consumption patterns, and historical emission trends.

For example, consider a steel manufacturing facility where the verification process or mechanism begins when a new emission reading arrives from one of its blast furnaces. The validation process or mechanism implementing the smart contract architecture or framework may receive data showing a 50-metric ton $CO_2$ emission reading from Furnace Unit-A at 14:30 hours, measured using infrared spectroscopy. The first stage of validation may include confirming the presence of a format by examining if all required data fields are present and properly formatted, such as the timestamp (14:30), emission quantity (50 MT), source identifier (Furnace Unit-A), and measurement method (infrared spectroscopy) must conform to predefined data structures.

Once the data structure passes initial validation, the smart contract implements context-specific verification rules for blast furnace emissions. The GGEMS may retrieve historical operational data showing that Furnace Unit-A typically produces between 45-55metric tons of $CO_2$ during peak operation hours (12:00-16:00). The verification unit 304C may check the facility's current production logs, which indicate the furnace is operating at 90% capacity, consuming standard amounts of coke fuel. The smart contract then correlates these parameters—the 50-metric ton reading aligns with both the historical emission pattern for this time of day and the current operational status.

The verification process continues by examining recent emission trends from the same furnace. The GGEMS may determine that over the past week, Furnace Unit-A's emissions averaged 48 metric tons during similar operational conditions, with a standard deviation of ±3 metric tons. The current reading of 50 metric tons falls within this expected range. The smart contract may also cross-reference maintenance records, confirming no recent equipment modifications or calibration events that might affect emission patterns. Additional validation checks compare the reading against the facility's documented production capacity, which states that at maximum throughput, this furnace model cannot exceed 60 metric tons of CO2 per hour.

When the reading was to show 80 metric tons instead of 50, the smart contract would flag this as an anomaly since it exceeds both historical patterns and the physical capabilities of the furnace. This would trigger additional verification steps, such as cross-checking with backup sensors or requesting manual verification. However, in this case, the 50-metric ton reading passes all validation stages, including data structure integrity, operational context alignment, historical pattern matching, and physical capacity verification, enabling the GGEMS to confirm this as a valid emission reading that can be recorded in the blockchain.

In an embodiment, the smart contract implemented using the blockchain architecture 304J may integrate consensus mechanisms that may require agreement across multiple validation nodes before accepting emission data into the blockchain. Each node independently processes the verification criteria and submits its validation result to the network. When the facility's emission reading passes primary validation checks, the smart contract initiates cross-validation against related operational parameters. This may include comparing the CO2 emission level against fuel consumption data, production output, and other correlated metrics to ensure consistency across all reported parameters.

For example, consider a chemical manufacturing facility that utilizes multiple data sources to monitor and verify its greenhouse gas emissions. The primary production line has IoT sensors measuring direct CO2 emissions, while optical character recognition (OCR) systems scan energy consumption meters, and augmented reality devices monitor equipment performance. At 09:30, the system initiates a cross-validation sequence when the IoT sensors report a CO2 emission spike of 75 metric tons from the main processing unit.

The cross-validation process begins by correlating this reading with energy consumption data captured through OCR. The utility meters show a corresponding power usage of 850 kWh during the same period, which aligns with the facility's documented energy-to-emission ratios. Simultaneously, the system pulls data from pressure sensors and flow meters connected to the production line, confirming that the increased emissions coincide with a planned production rate increase, where raw material flow increased by 25% at 09:15.

Further cross-validation may be implemented through augmented reality measurements taken by operators conducting their routine equipment inspections. The AR devices record thermal signatures from the production equipment, showing elevated operating temperatures consistent with increased production loads. The system compares these multiple data streams against each other, for example, the IoT emission readings, power consumption data, production flow rates, and thermal measurements all indicate a proportional increase in facility operations.

The cross-validation process or mechanism may extend to external data sources as well. The facility's automated procurement system shows a recent increase in raw material deliveries, supporting the higher production rates. Weather station data confirms stable atmospheric conditions, eliminating environmental factors as potential anomaly sources. The enterprise resource planning system provides production schedules that match the timing of the emission increase, while maintenance logs show no equipment irregularities that might affect emission patterns.

When discrepancies arise between sources, the system employs weighted validation rules. For instance, if the IoT sensors report elevated emissions but the energy consumption data shows normal levels, the GGEMS flags this contradiction for further investigation. The verification unit 304C maintains a hierarchy of data source reliability, giving higher weight to direct measurement sources like calibrated IoT sensors while using indirect measurements from OCR and AR devices as supporting validation points. Such a multilayered mechanism may enable identify potential sensor malfunctions or data transmission errors while maintaining the integrity of the emission monitoring process.

In an embodiment, the verification criteria implemented by the smart contracts may include multiple validation layers. The first layer addresses technical validation requirements, including data format compliance, measurement unit consistency, and temporal sequence verification. For instance, if the facility's emission monitoring unit 304A typically reports readings every hour, the smart contract automatically flags potential fraudulent entries or any data points that deviate from this established temporal pattern. The second layer implements business logic validation, comparing emission data against predefined operational parameters and regulatory thresholds. For instance, when the facility's typical emission range is 40-60 metric tons per hour during normal operation, the smart contract applies statistical analysis to verify that the reported 50-metric ton reading aligns with expected operational patterns.

In an embodiment, the verification unit 304C may implement dynamic threshold adjustment values or mechanisms within the smart contracts to account for operational variations. These thresholds are automatically updated based on historical data patterns, seasonal variations, and operational schedules. For example, when the facility typically reduces production during maintenance periods, the smart contract adjusts its validation parameters accordingly to prevent false rejection of legitimately lower emission readings during these periods. Each validation node maintains a local copy of the verification history, creating an auditable trail of all validation decisions. When the example 50-metric ton reading undergoes verification, the smart contract generates a detailed validation record, including timestamp, applied verification criteria, validation results, and consensus status across all participating nodes. This information is then stored within the proof-of-history blockchain architecture 304J, creating an immutable record of the verification process.

For example, consider a cement manufacturing plant that operates throughout the year with varying production levels and emission patterns that change with seasonal conditions. During a typical summer day in July, the verification unit 304C may process emission data from the plant's primary kiln, which operates at higher temperatures due to ambient conditions. The smart contract may maintain a dynamic baseline derived from analyzing the past three months of emission data, showing that summer operations typically generate 15-20% higher CO2 emissions compared to spring months due to increased energy requirements for maintaining optimal kiln temperatures.

When new emission readings arrive at 13:00 hours, showing 65 metric tons of CO2, the verification unit 304C may automatically adjust its validation thresholds based on multiple factors. The verification unit 304C may recognize that July historically shows peak emission patterns, and the current ambient temperature of 35° C. aligns with documented correlations between temperature and emission levels. The smart contract also factors in the plant's current production schedule, which indicates maximum capacity operation during this shift, and automatically adjusts the acceptable emission range to 60-70 metric tons per hour, compared to the 50-60 metric ton range used during cooler months.

In an embodiment, the verification unit 304C may continuously update these thresholds by processing new data patterns. For instance, after analyzing two weeks of July operations, the verification unit 304C detected that morning shifts consistently show lower emissions than afternoon shifts due to lower ambient temperatures. The smart contract automatically incorporated this pattern, creating time-specific threshold ranges: 55-65 metric tons for morning operations and 60-70 metric tons for afternoon operations. When emission readings arrive from the night shift, the verification unit 304C may apply different thresholds that account for reduced production rates and cooler temperatures. The smart contract may adapt to operational schedules. During planned maintenance periods, the system automatically lowers emission thresholds by 40% to reflect reduced operations. When the plant switches between different types of raw materials, the verification unit adjusts its thresholds based on the documented emission factors of each material type. For example, when the plant processes alternative raw materials with lower carbon content, the system automatically adjusts its verification parameters to expect 10-15% lower emission readings.

In an embodiment, the verification unit 304C implementing the smart contracts may execute operations to handle errors and exception management protocols. If any validation node detects anomalies or potential issues, the smart contract automatically initiates additional verification procedures. For instance, if the 50-metric ton reading passes primary validation but shows unusual patterns during cross-validation, the GGEMS may require additional verification steps or human review before accepting the data into the blockchain. The validation nodes may execute operations in a coordinated manner while maintaining independence in their verification processes. Such distributed architecture may enable the GGEMS operational resilience and may prevent single points of failure in the verification process. For example, if one validation node experiences technical issues, the remaining nodes continue processing verification requests, maintaining system availability and integrity.

In an embodiment, the converting unit 304D implements advanced machine learning algorithms to standardize and validate the token creation process, ensuring that each carbon credit token meets rigorous environmental and financial standards. These algorithms cross-reference the emissions data against distributed data sources 102, 202, and 302, international frameworks like ISO 14064, checking for consistency, accuracy, and compliance. By integrating machine learning with blockchain architecture 304J, the GGEMS 104, 204H, and 304 can automatically classify and categorize emissions data, transforming complex environmental measurements into standardized, tradable digital assets that represent verifiable carbon reduction achievements. In an embodiment, the tokenization mechanism may create a dynamic ecosystem where carbon credits become programmable financial instruments. Smart contracts embedded within the tokens can automatically execute predefined actions, such as triggering payments when certain environmental milestones are achieved or enabling the automatic retirement of credits to offset corporate emissions. The above-described mechanism may transform carbon credits from static certificates into active, intelligent assets that may drive more immediate and impactful environmental action across global markets.

By converting greenhouse gas emissions data into standardized tokens, the GGEMS 104, 204H, and 304 may create a bridge between environmental measurement and financial markets, incentivizing carbon reduction through a transparent, verifiable, and technologically advanced mechanism. The tokenization process may enable smaller entities and individual stakeholders to participate in global emissions reduction efforts while providing a clear, quantifiable mechanism of tracking and valuing environmental impact.

In an embodiment, the converting unit 304D may process the verified emission data through smart contracts (e.g., 304H) in the blockchain that may include predefined rules and criteria for token generation. Each token represents a quantified amount of verified carbon credits based on the validated emission data. The conversion or transformation maintains the temporal relationship of the emission data through the proof-of-history blockchain's timestamp mechanism using VDF. The converted or transformed tokens retain an immutable link to the original verified emission data stored in the blockchain, ensuring auditability and traceability. Once generated, these standardized tokens can be managed through the GGEMS 104, 204H, and 304 Web 3.0 interface (e.g., UI, dashboards, etc.) and API endpoints, enabling controlled access for trading and transfer operations while maintaining the blockchain's data integrity. In an embodiment, the standardized tokens may be burned (e.g., permanently removed from circulation) if needed, providing flexibility in carbon credit lifecycle management. The entire conversion process is automated through smart contracts while maintaining compliance with relevant carbon credit trading standards and protocols.

In an embodiment, the Proof-of-History-based blockchain architecture 304J optimizes data storage and verification through temporal referencing. The Proof-of-History-based blockchain architecture 304J addresses scalability challenges by implementing an efficient data storage mechanism. Rather than storing complete emission data records, the verification unit may maintain temporal reference points, significantly reducing storage requirements and computational overhead. This architectural approach enables the system to process and verify large volumes of emission data without degradation in performance. The verification mechanism relies on temporal validation, where the verification unit verifies the chronological integrity of emission data through timestamp verification. When subsequent data processing is required, the verification unit may include these temporal references to access the corresponding emission data, enabling efficient data retrieval while maintaining the integrity of the verification process. The above-described mechanism may enable scalable performance while maintaining the security and reliability requirements for greenhouse gas emission monitoring and verification.

For example, consider a large industrial facility that operates multiple greenhouse gas emission monitoring points. Throughout a typical day, sensors continuously collect emission data from multiple distributed sources, such as the main factory chimney, various production line vents, and auxiliary processing units. At 10:15 AM, the GGEMS receives a burst of readings: the main chimney records 500 ppm of CO2, while simultaneously, the production line sensors detect varying levels between 475-525 ppm.

In an embodiment, instead of storing the complete emission records in the blockchain, the verification unit creates temporal reference points using the VDF. For instance, when the 10:15 AM readings arrive, the GGEMS generates a unique hash timestamp (let's say "a1b2c3") that serves as a temporal anchor. This timestamp is then linked to subsequent readings, creating a chronological chain of reference points rather than storing the full data sets. The GGEMS verification unit may validate the chronological integrity by examining the temporal reference points. For example, if an auditor needs to verify the 10:15 AM readings, they can use the temporal reference "a1b2c3" to access the specific emission data from that time. The GGEMS confirms the chronological sequence matches the expected pattern, verifying that no data has been altered or inserted after the fact.

In an embodiment, the above-referenced mechanism may be efficient when handling large volumes of data. Consider a scenario where the facility's sensors generate readings every second. Instead of storing thousands of complete emission records in the blockchain, the GGEMS maintains a lightweight chain of temporal references. When the environmental compliance team needs to generate a report, they can efficiently retrieve specific data points using these temporal references, while the blockchain's inherent properties ensure the data's integrity hasn't been compromised. In an embodiment, when the facility adds more sensors or increases monitoring frequency, the blockchain only needs to store additional temporal references, not complete data sets.

In an embodiment, integration with the proof-of-history blockchain architecture 304J enables efficient storage and retrieval of validation results while maintaining data immutability. The GGEMS 104, 204H, and 304 store validation outcomes as part of the blockchain's timestamp blocks, creating a verifiable link between emission data, validation results, and temporal sequence. This integration ensures that validated emission data becomes part of an immutable record that can be efficiently accessed for regulatory reporting and audit purposes. The smart contract validation mechanism provides automated enforcement of regulatory compliance requirements by incorporating relevant standards and regulations into the validation criteria. For instance, if regulatory requirements specify maximum allowable emission levels or required measurement frequencies, these parameters are automatically enforced through the smart contract validation rules.

Figure 4A:
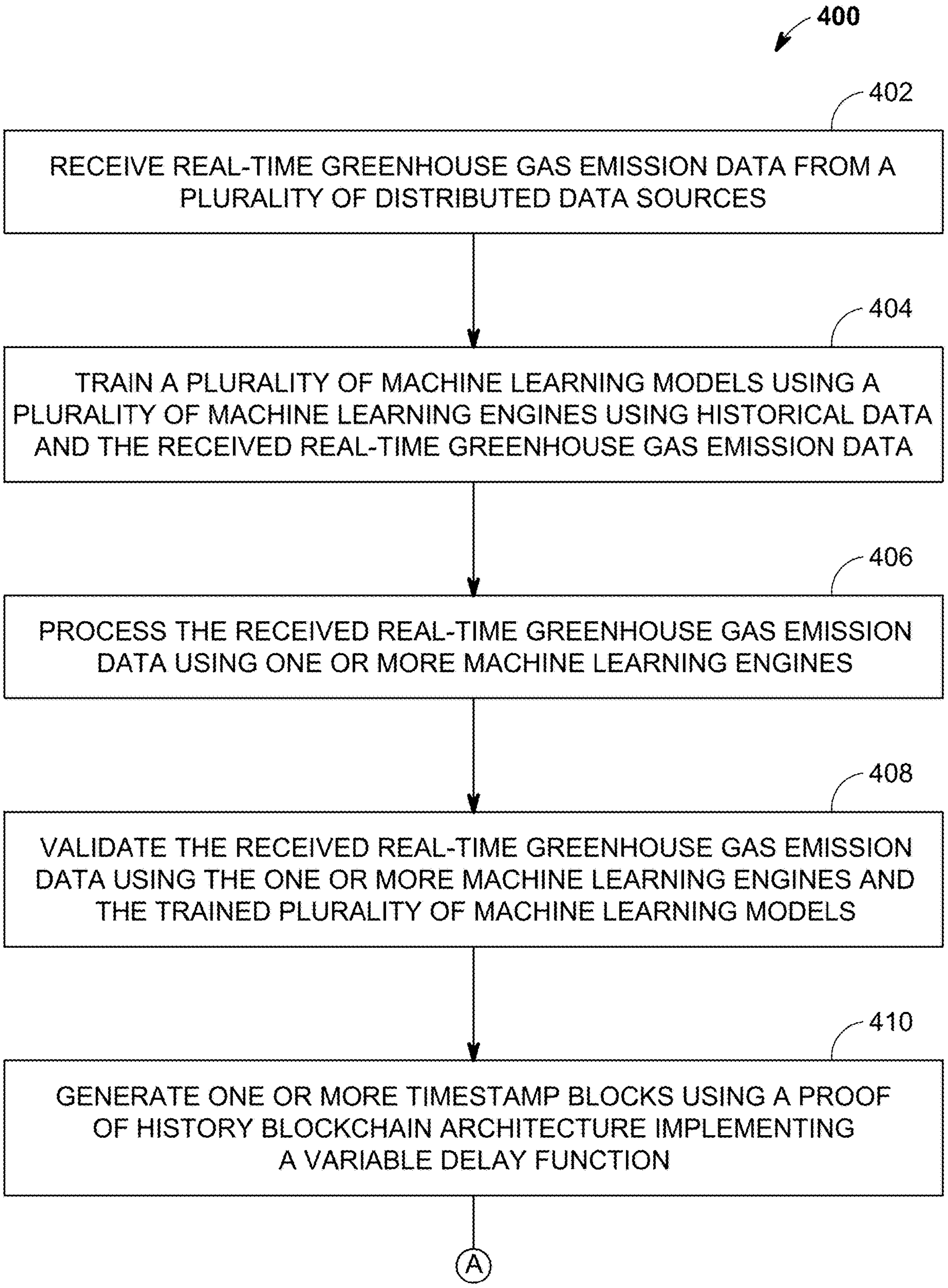
FIGS. 4A and 4B are flow diagrams showing a process for managing greenhouse gas emissions, according to an exemplary embodiment.
Figure 4B:
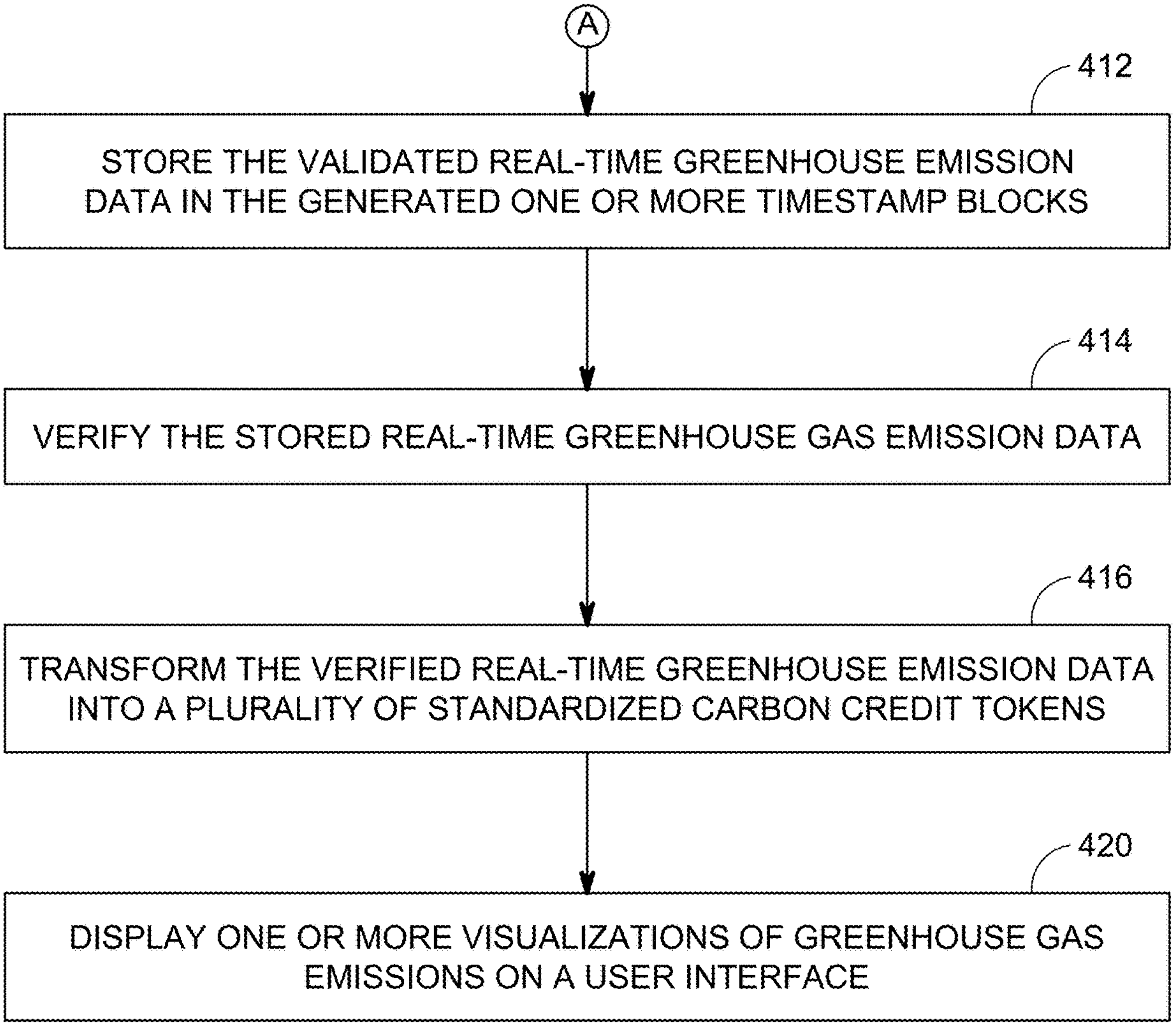

FIGS. 4A and 4B are flow diagrams showing a process 400 for managing greenhouse gas emissions, according to an exemplary embodiment. FIGS. 4A and 4B are described in conjunction with FIGS. 1-2. FIGS. 4A and 4B are illustrations showing process 400 for managing greenhouse gas emissions. Each step in process 400 is implemented or executed by the modules, units, ML engines, ML models, circuitries, logics, codes, and processors as described with reference to FIGS. 1-3. In an embodiment, the following described process steps of process 400 may be implemented by the GGEMS 104, 204H, and 304.

At step 402, real-time greenhouse gas emission data from a plurality of distributed data sources is received. For instance, the plurality of distributed data sources consists of a plurality of Internet of Things (IoT) sensors, multiple optical character recognition systems, and multiple augmented reality measurement devices. In an embodiment, a central processing unit (CPU) of the GGEMS may cooperatively work with dedicated input/output (I/O) controllers to receive real-time greenhouse gas emission data from distributed data sources through network interface cards (NICs) and data acquisition modules. The received data streams are buffered in high-speed cache memory before processing. At step 404, multiple ML engines train multiple ML models. For instance, the multiple ML models may be trained by the multiple ML engines using historical data and the received real-time greenhouse gas emission data. In an embodiment, an artificial intelligence (AI) processor, such as a neural processing unit (NPU), works in conjunction with dedicated tensor processing units (TPUs) to train machine learning models using parallel processing architecture. The TPUs access historical data stored in solid-state drives (SSDs) while processing incoming real-time data streams from system RAM. At step 406, the received real-time greenhouse gas emission data is processed using one or more machine learning engines. For instance, based on the trained ML models, the received greenhouse gas emission in real-time may be processed or analyzed by the respective units (e.g., monitoring unit, reporting unit, verification unit, converting unit, ML models, ML engines, etc.,), and the integrated system 202 as shown and described with reference to FIGS. 1-3. In an embodiment, Field programmable gate arrays (FPGAs) implement customized processing pipelines optimized for the specific machine learning engines. The FPGAs contain dedicated multiply-accumulate (MAC) units and on-chip memory blocks to execute neural network computations in parallel efficiently.

At step 408, the received real-time greenhouse gas emission data is validated using the one or more machine learning engines and the trained plurality of machine learning models. In an embodiment, the validation may include a multi-stage validation consisting of validation of the integrity of a data structure by confirming a presence and format of a plurality of parameters. The multi-stage validation may further include an execution of a plurality of validation rules based on an emission type and source of emissions. For instance, application-specific integrated circuits (ASICs) designed for machine learning validation tasks process the data streams using hardwired implementations of the trained models stored in read-only memory (ROM). The ASICs incorporate dedicated hardware blocks for matrix operations and feature extraction. At step 410, one or more timestamp blocks using a proof of history blockchain architecture implementing a variable delay function are generated. In an embodiment, the blockchain architecture may include or maintain multiple temporal references for each of the real-time greenhouse gas emission data. For instance, a blockchain co-processor generates timestamp blocks by implementing the proof-of-history architecture through dedicated cryptographic processing units. The variable delay function is executed on specialized arithmetic logic units (ALUs) optimized for the required mathematical operations.

At step 412, the validated real-time greenhouse emission data in the generated one or more timestamp blocks are stored. In an embodiment, Direct memory access (DMA) controllers manage high-speed data transfer to store validated emission data in the timestamp blocks within solid-state storage arrays. Content-addressable memory (CAM) enables rapid blockchain data indexing and retrieval. At step 414, the stored real-time greenhouse gas emission data is verified. In an embodiment, the step of verification may include dynamically adjusting one or more values based on historical data patterns, seasonal variations, and one or more operational schedules. For instance, the CPU implemented as a security processor incorporating a hardware security module (HSM) verifies the stored data using cryptographic accelerators and secure key storage. The verification results are buffered in protected memory regions. At step 416, the verified real-time greenhouse emission data is transformed into a plurality of standardized carbon credit tokens. In an embodiment, dedicated blockchain ASICs transform the verified data into standardized tokens using hardwired smart contract execution units and token generation circuits. The tokens are stored in tamper-resistant memory. At step 418, one or more visualizations of greenhouse gas emissions, including the plurality of standardized carbon tokens, are displayed on a user interface. In an embodiment, a graphics processing unit (GPU) renders real-time visualizations of the emission data and generates the user interface display output. The GPU uses dedicated shader processors and video memory to create the graphical elements. The operational efficacies and further implementations of the steps (e.g., 402, 404, 406, 408, 410, 412, 414, 416, and 418) in the process 400 are described in FIGS. 1-3.

Consider a scenario where a global agricultural technology company, AgriTech Innovations, develops a comprehensive greenhouse gas emissions management system for large-scale farming operations across multiple continents. The GGEMS integrates IoT sensors deployed throughout agricultural landscapes, optical character recognition devices monitoring equipment and vehicles, and augmented reality measurement tools tracking emissions from farm machinery and livestock operations.

The implementation may include strategically positioned IoT sensors in crop fields, livestock areas, and agricultural processing facilities across Brazil, Argentina, and the United States. The IoT sensors may continuously capture real-time greenhouse gas emissions data, including methane from cattle, carbon dioxide from machinery operations, and nitrous oxide from fertilizer applications. Simultaneously, optical character recognition systems mounted on tractors and transportation trucks scan equipment performance logs and fuel consumption records, while augmented reality devices provide precise spatial measurements of emissions from different agricultural activities.

Machine learning engines process the collected data by training on historical agricultural emissions datasets and developing predictive models that can identify complex emissions patterns. The ML models perform advanced anomaly detection, cross-validating data from multiple sensor types to ensure accuracy and identify potentially fraudulent or inconsistent entries. A self-organizing data mapping algorithm classifies emissions data according to ISO 14064 standards, enabling precise categorization and standardization of greenhouse gas measurements.

The GGEMS implements a blockchain-based proof of history architecture with a verifiable delay function, generating sequential timestamps that cryptographically secure the chronological integrity of emissions data. Smart contracts automatically validate each emissions record against predefined verification criteria, ensuring transparency and preventing manipulation. When emissions data passes validation, the system transforms verified measurements into non-fungible carbon credit tokens that can be traded on a specialized carbon markets platform. A Web 3.0 dashboard interface provides role-based access control, allowing different stakeholders, such as farm managers, environmental regulators, and carbon credit traders, to view real-time analytics of emissions patterns. The dashboard visualizes greenhouse gas emissions through interactive graphs, geographical heat maps, and detailed reports that track emissions across different agricultural activities and geographical regions. The concurrent data processing monitoring unit enables simultaneous collection and validation of emissions data from multiple distributed data sources, maintaining high data integrity and providing near-instantaneous insights into agricultural greenhouse gas production. By implementing the GGEMS, AgriTech Innovations demonstrates how advanced technological integration can transform emissions monitoring from a complex, fragmented process into a streamlined, transparent, and actionable environmental management approach.

Figure 5:
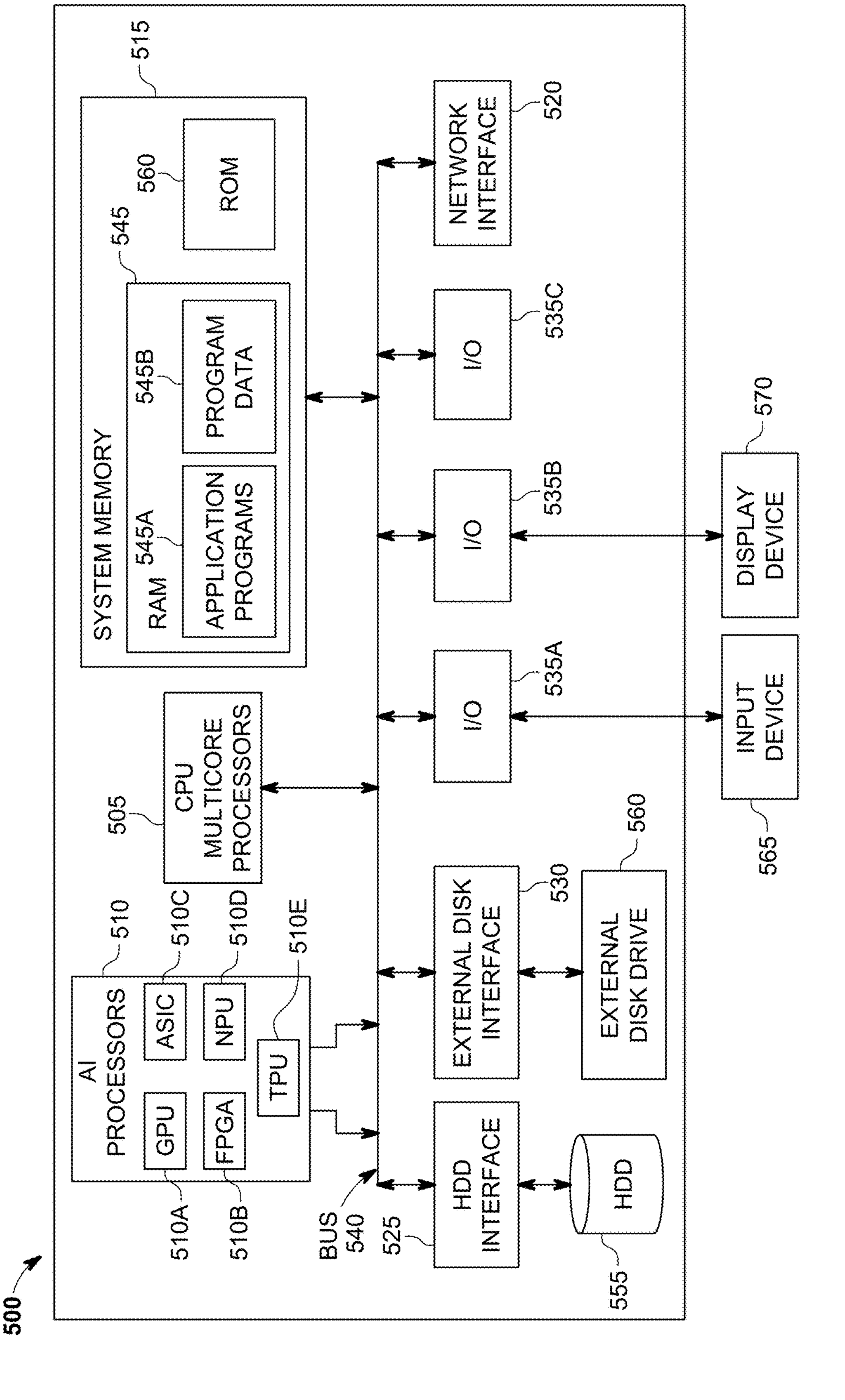
FIG. 5 is an illustration showing an exemplary hardware configuration of a special-purpose computer that may be used to implement components for managing greenhouse gas emissions, according to exemplary embodiments.

FIG. 5 is an illustration showing an exemplary hardware configuration of a special-purpose computer 500 that may be used to implement components for managing greenhouse gas emissions, according to exemplary embodiments. The special-purpose computer 500, shown in FIG. 5, includes CPU 505, including multicore processors, AI processors 510 including Graphics Processing Units (GPU) 510A, Field-Programmable Gate Arrays (FPGA) 510B, Application-Specific Integrated Circuits (ASIC) 510C, Neural Processing Units (NPU) 510D, Tensor Processing Units (TPU) 510E, system memory 515, network interface 520, hard disk drive (HDD) interface 525, external disk drive interface 530, and input/output (I/O) interfaces 535A, 535B, 535C. These above-described components or hardware elements of the special-purpose computer 500 may be communicatively coupled to each other via a system bus 540. In an embodiment, the CPU 505 may execute operations related to arithmetic, logic, and/or control operations by accessing the system memory 515. The CPU 505 and the AI processors 510 may implement the interfaces, the processors, etc., of the exemplary devices and/or systems described above. The AI processors 510 may execute or perform operations for processing AI tasks. The AI processors 510 may include multiple types of processors that may be tailored or customized for implementing specific AI workloads.

In an embodiment, the GPU 510A may be designed for rendering graphics and may be highly effective for executing operations related to AI tasks due to their parallel processing capabilities. The GPU 510A may execute multiple calculations simultaneously and may be used for training AI models. The GPU 510A with AI-specific hardware (e.g., the ASIC 510C, the NPU 510D, the TPU 510E, etc.) may be integrated to accelerate the AI tasks. For example, tensor cores may be designed to speed up the training of neural networks and ML models by enhancing matrix multiplications that may be core functions of many AI algorithms. In an embodiment, the FPGA 510B may be reconfigurable processors that may be implemented for executing specific AI tasks, thereby offering flexibility and efficiency in real-time applications. The FPGA 510B may have a unique design that may include a series of interconnected and configurable logic blocks. The re-programmability of the FPGA 510B enables a high level of customization, enabling it to implement a wide range of AI applications.

In an embodiment, the ASIC 510C may be custom-designed processors optimized for specific AI applications, providing high performance and energy efficiency. The ASIC 510C may be built or designed with the singular purpose of accelerating the AI workloads. The ASIC 510C is not reprogrammable like the FPGA 510B, but its specialized design enables significant improvements in speed and efficiency for tasks such as deep learning inference and training. In an embodiment, the NPU 510D may be designed to execute operations or functions related to specialized AI tasks, particularly those involving neural networks. The NPU 510D may be designed to accelerate neural network computations, often integrated into CPUs or Systems on Chips (SoCs). The NPU 510D may execute operations to process large volumes of data faster than other general-purpose processors and perform various AI tasks such as image recognition and natural language processing (NLP). The NPU 510D may be used in mobile devices and personal computers to implement the execution of AI tasks without significantly increasing power consumption.

In an embodiment, the TPU 510E may be designed specifically for accelerating ML workloads, particularly those involving tensor computations. The TPU 510E may be used in data centers to power various AI services such as search algorithms and language translation. The TPU 510E processor architecture may be optimized for high throughput and low latency that may facilitate the implementation of large-scale AI applications. In an embodiment, the AI processors 510, including the GPU 510A, the FPGA 510B, the ASIC 510C, the NPU 510D, and the TPU 510E, may execute operations or functions to perform multiple complex operations, computations, and calculations simultaneously, thereby enabling faster execution of the AI tasks compared to the sequential processing of general purpose CPUs. The AI processors 510 may be designed to execute the operations in a more energy-efficient way. For example, low-precision arithmetic can be used to reduce power consumption, thereby improving the performance of the implemented AI applications. In an embodiment, the AI processors 510 may be customized to implement specific AI models, ML models, ML engines, and AI applications, enabling optimized execution of operations or functions.

In an embodiment, the implementation of AI workloads or AI tasks using the AI processors 510 may provide technical advantages or technical benefits of parallel processing, reduced precision, hardware optimization, energy efficiency, and neural network support. The AI processors 510 may be designed with high parallelism, allowing them to execute multiple AI-related calculations simultaneously. The AI tasks or AI workloads, including matrix multiplication and vector operations, may be used in neural networks. The AI processors 510 may use reduced-precision arithmetic (e.g., 8-bit or 16-bit) to improve computational and power efficiency while maintaining acceptable accuracy levels for AI tasks. The AI processors 510 may incorporate specialized hardware components such as multiply-accumulate (MAC) units and on-chip memory for executing specific AI workloads. The AI processors 510 may be optimized for neural network tasks, including forward and backward passes during training and inference, and support various neural network architectures and frameworks In an embodiment, the special-purpose computer 500 does not necessarily include AI processors 510, for example, in case the special-purpose computer 500 is used for implementing a device other than a central processing device. The system memory 515 may store information and/or instructions for use in combination with the CPU 505. The system memory 515 may include volatile and non-volatile memory, such as random-access memory (RAM) 545 and read-only memory (ROM) 550. A basic input/output system (BIOS) containing the basic routines that help to transfer information between elements within the special-purpose computer 500, such as during start-up, may be stored in the ROM 550. The system bus 540 may be any of several types of bus structures, including a memory bus or memory controller, a peripheral bus, and a local bus using any of a variety of bus architectures.

The special-purpose computer 500 may include the network interface 520 for communicating with other computers and/or devices via a network.

Further, the special-purpose computer 500 may include a hard disk drive (HDD) 555 for reading from and writing to a hard disk (not shown) and an external disk drive 560 for reading from or writing to a removable disk (not shown). The removable disk may be a magnetic disk for a magnetic disk drive or an optical disk such as a CD ROM for an optical disk drive. The HDD 555 and the external disk drive 560 are connected to the system bus 540 by the HDD interface 525 and the external disk drive interface 530, respectively. The drives and their associated non-transitory computer-readable media provide non-volatile storage of computer-readable instructions, data structures, program modules, and other data when the special-purpose computer operates as a general-purpose computer. The relevant data may be organized in a database, such as a relational or object database.

Although the exemplary environment described herein employs a hard disk (not shown) and an external disk (not shown), it should be appreciated by those skilled in the art that other types of computer-readable media which may store data that is accessible by a computer, such as magnetic cassettes, flash memory cards, digital video disks, random access memories, read-only memories, and the like, may also be used in the exemplary operating environment.

Several program modules may be stored on the hard disk, external disk, the ROM 550, or the RAM 545, including an operating system (not shown), one or more application programs 545A, other program modules (not shown), and program data 545B. The application programs may include at least some of the functionality described above.

The special-purpose computer 500 may be connected to input device 565, such as mouse and/or keyboard, and display device 570, such as liquid crystal display, via corresponding I/O interfaces 535A to 535C and the system bus 540. In addition to an implementation using a special-purpose computer 500, as shown in FIG. 5, part or all of the functionality of the exemplary embodiments described herein may be implemented as one or more hardware circuits. Examples of such hardware circuits may include but are not limited to Large Scale Integration (LSI), Reduced Instruction Set Circuits (RISC), etc.

One or more embodiments are now described with reference to the drawings, wherein reference numerals refer to elements throughout. Numerous specific details are set forth in the following description to provide a thorough understanding of the various embodiments. It is evident, however, that the various embodiments may be practiced without these specific details (and without applying them to any networked environment or standard).

As used in this application, in some embodiments, the terms "component," "system," and the like are intended to refer to, or comprise, a computer-related entity or an entity related to an operational apparatus with one or more specific functionalities, wherein the entity may be either hardware, a combination of hardware and software, software, or software in execution. As an example, a component may be but is not limited to, a process running on a processor, a processor, an object, an executable, a thread of execution, computer-executable instructions, a program, and/or a computer. By way of illustration and not limitation, both an application running on a server and the server may be a component.

The above descriptions and illustrations of embodiments, including what is described in the Abstract, are not intended to be exhaustive or to limit one or more embodiments to the precise forms disclosed. While specific embodiments of, and examples for, one or more embodiments are described herein for illustrative purposes, various equivalent modifications are possible within the scope, as those skilled in the relevant art will recognize. These modifications may be made considering the above-detailed description. Rather, the scope is to be determined by the following claims, which are to be interpreted in accordance with established doctrines of claim construction.

What is claimed is:

1. A system for real-time monitoring, machine-learning-enabled validation, and blockchain-based verification of greenhouse gas emission data, comprising:

a processor;

a memory storing instructions, which, when executed by the processor, causes the processor to execute operations, to:

receive real-time greenhouse gas emission data from a plurality of distributed data sources, wherein the plurality of distributed data sources consists of a plurality of Internet of Things (IoT) sensors configured to continuously capture greenhouse gas emission data, a plurality of optical character recognition systems configured to scan equipment performance logs and fuel consumption records, and a plurality of augmented reality measurement devices configured to measure objects using a combination of reality and virtual world simulation;

train a plurality of machine learning (ML) models using a plurality of ML engines using historical data and the received real-time greenhouse gas emission data, wherein training comprises adjusting weights of nodes in the plurality of ML models based on patterns detected in the received real-time greenhouse gas emission data using backpropagation, wherein the plurality of ML models adapt to patterns in emission data and improve accuracy over time through iterative training;

using the trained plurality of ML models, process the received real-time greenhouse gas emission data using one or more ML engines, comprising:

validating the received real-time greenhouse gas emission data using the one or more ML engines and the trained plurality of ML models, wherein the validation includes a multi-stage validation consisting of one or more of a validation of an integrity of a data structure by confirming a presence and format of a plurality of parameters, and further includes an execution of a plurality of validation rules based on an emission type and source of emissions, wherein the multi-stage validation further comprises cross-validating data across the plurality of distributed data sources to identify discrepancies between related emission parameters and flagging potential data anomalies based on comparison of readings from the plurality of IoT sensors against the fuel consumption records obtained through the plurality of optical character recognition systems;

generating one or more timestamp blocks using a proof of history blockchain architecture implementing a variable delay function, wherein the proof of history blockchain architecture generates cryptographic hashes that incorporate both a previous block's hash value and an elapsed time to ensure temporal ordering of the emission data, and wherein the proof of history blockchain architecture includes a plurality of temporal references for each of the real-time greenhouse gas emission data;

storing the validated real-time greenhouse emission data in the generated one or more timestamp blocks by encoding the validated real-time greenhouse emission data into the proof of history blockchain architecture through cryptographic hashing, wherein an iterative hashing procedure is used wherein, for each emission data point stored in a current timestamp block, a hash value of a previous timestamp block is retrieved and combined with current temporal information and a sequential function is performed using a verifiable time delay, and generates a new hash value that cryptographically proves the passage of time between the current timestamp block and the previous timestamp block, and wherein timestamped emission data is organized into a data structure that includes a timestamp identifier, a previous block's hash value, a newly created hash and a reference pointer to an associated data record; and verify the stored real-time greenhouse gas emission data, wherein the verification is implemented through a distributed network of validation nodes executing smart contracts that enforce predefined verification rules, and wherein the verification includes dynamically adjusting one or more values based on historical data patterns, seasonal variations, and one or more operational schedules;

transform the verified real-time greenhouse emission data into a plurality of standardized carbon credit tokens, wherein the standardized carbon credit tokens retain an immutable link to the original verified emission data stored in the proof of history blockchain architecture; and display one or more visualizations of greenhouse gas emissions on a user interface, including the plurality of standardized carbon credit tokens, wherein the one or more visualizations include information on a real-time greenhouse gas emission report;

wherein the processor uses parallel processing to simultaneously process multiple emission readings of emission data.

2. The system of claim 1, wherein the verifiable delay function generates a plurality of sequential timestamps to verify a chronological order of the real-time greenhouse gas emission data.

3. The system of claim 1, wherein validating the received greenhouse gas emission data further comprises:

perform anomaly detection to identify data inconsistencies using the one or more ML engines and the trained plurality of ML models;

perform a cross-validation across the plurality of distributed data sources and flag potential fraudulent entries of one or more received greenhouse emission data based on historical patterns.

4. The system of claim 1, wherein the one or more ML engines execute operations to detect fraud, and wherein the one or more ML engines implement a self-organizing data mapping algorithm to classify and categorize emission data according to ISO 14064 standards.

5. The system of claim 1, wherein one or more smart contracts automatically validate emission data based on predefined verification criteria and consensus mechanisms.

6. The system of claim 1, wherein the plurality of standardized carbon credit tokens is implemented as non-fungible tokens (NFTs) that follow standardized formats conforming to ISO 14064 greenhouse gas emission reporting standards, wherein each non-fungible token is cryptographically generated to represent a specific quantum of greenhouse gas reduction with metadata embedded directly into a blockchain record of the non-fungible token that includes provenance information comprising emission source, measurement methodology, and verification timestamp, and wherein the plurality of standardized carbon credit tokens can be traded on specialized carbon markets, transferred between stakeholders, fractionalized, or retired to demonstrate carbon neutralization efforts.

7. The system of claim 1, further comprises: a monitoring unit that implements concurrent data processing to simultaneously collect and validate data from multiple sources while maintaining data integrity.

8. The system of claim 1, wherein the user interface includes a Web 3.0 dashboard interface, provides role-based access control and real-time analytics of emission patterns.

9. A method for real-time monitoring, machine-learning-enabled validation, and blockchain-based verification of greenhouse gas emission data, comprising:

receiving real-time greenhouse gas emission data from a plurality of distributed data sources, wherein the plurality of distributed data sources consists of a plurality of Internet of Things (IoT) sensors configured to continuously capture greenhouse gas emission data, a plurality of optical character recognition systems configured to scan equipment performance logs and fuel consumption records, and a plurality of augmented reality measurement devices configured to measure objects using a combination of reality and virtual world simulation;

training a plurality of machine learning (ML) models using a plurality of ML engines using historical data and the received real-time greenhouse gas emission data, wherein training comprises adjusting weights of nodes in the plurality of ML models based on patterns detected in the received real-time greenhouse gas emission data using backpropagation, wherein the plurality of ML models adapt to patterns in emission data and improve accuracy over time through iterative training;

using the trained plurality of ML models, processing the received real-time greenhouse gas emission data using one or more ML engines, comprising:

validating the received real-time greenhouse gas emission data using the one or more ML engines and the trained plurality of ML models, wherein the validation includes a multi-stage validation consisting of one or more of a validation of an integrity of a data structure by confirming a presence and format of a plurality of parameters, and further includes an execution of a plurality of validation rules based on an emission type and source of emissions, wherein the multi-stage validation further comprises cross-validating data across the plurality of distributed data sources to identify discrepancies between related emission parameters and flagging potential data anomalies based on comparison of readings from the plurality of IoT sensors against the fuel consumption records obtained through the plurality of optical character recognition systems;

generating one or more timestamp blocks using a proof of history blockchain architecture implementing a variable delay function, wherein the proof of history blockchain architecture generates cryptographic hashes that incorporate both a previous block's hash value and an elapsed time to ensure temporal ordering of the emission data, and wherein the proof of history blockchain architecture includes a plurality of temporal references for each of the real-time greenhouse gas emission data;

storing the validated real-time greenhouse emission data in the generated one or more timestamp blocks by encoding the validated real-time greenhouse emission data into the proof of history blockchain architecture through cryptographic hashing, wherein an iterative hashing procedure is used wherein, for each emission data point stored in a current timestamp block, a hash value of a previous timestamp block is retrieved and combined with current temporal information and a sequential function is performed using a verifiable time delay, and generates a new hash value that cryptographically proves the passage of time between the current timestamp block and the previous timestamp block, and wherein timestamped emission data is organized into a data structure that includes a timestamp identifier, a previous block's hash value, a newly created hash and a reference pointer to an associated data record; and verifying the stored real-time greenhouse gas emission data, wherein the verification is implemented through a distributed network of validation nodes executing smart contracts that enforce predefined verification rules, and wherein the verification includes dynamically adjusting one or more values based on historical data patterns, seasonal variations, and one or more operational schedules;

transforming the verified real-time greenhouse emission data into a plurality of standardized carbon credit tokens, wherein the standardized carbon credit tokens retain an immutable link to the original verified emission data stored in the proof of history blockchain architecture; and displaying one or more visualizations of greenhouse gas emissions on a user interface, including the plurality of standardized carbon credit tokens, wherein the one or more visualizations include information on a real-time greenhouse gas emission report;

wherein a processor uses parallel processing to simultaneously process multiple emission readings of emission data.

10. The method of claim 9, further comprising: generating a plurality of sequential timestamps using the variable delay function to verify a chronological order of the real-time greenhouse gas emission data.

11. The method of claim 9, wherein validating the received greenhouse gas emission data further comprises:

performing anomaly detection to identify data inconsistencies using the one or more ML engines and the trained plurality of ML models;

performing cross-validation across the plurality of distributed data sources; and flagging potential fraudulent entries of one or more received greenhouse emission data based on historical patterns.

12. The method of claim 9, further comprising: detecting a fraud using the one or more ML engines that implement a self-organizing data mapping algorithm to classify and categorize emission data according to ISO 14064 standards.

13. The method of claim 9, further comprising: automatically validating emission data based on predefined verification criteria and consensus mechanisms using one or more smart contracts.

14. The method of claim 9, wherein the plurality of standardized carbon credit tokens is implemented as non-fungible tokens (NFTs) that follow standardized formats conforming to ISO 14064 greenhouse gas emission reporting standards, wherein each non-fungible token is cryptographically generated to represent a specific quantum of greenhouse gas reduction with metadata embedded directly into a blockchain record of the non-fungible token that includes provenance information comprising emission source, measurement methodology, and verification timestamp, and wherein the plurality of standardized carbon credit tokens can be traded on specialized carbon markets, transferred between stakeholders, fractionalized, or retired to demonstrate carbon neutralization efforts.

15. The method of claim 9, further comprising: processing data concurrently to simultaneously collect and validate data from multiple sources while maintaining data integrity.

16. The method of claim 9, wherein the user interface includes a Web 3.0 dashboard interface, provides role-based access control and real-time analytics of emission patterns.

* * * * *